(12) United States Patent
Sanchez et al.

(10) Patent No.: US 12,377,869 B1
(45) Date of Patent: Aug. 5, 2025

(54) SYSTEMS AND METHODS FOR DETERMINING SITUATIONAL INTERPRETATION INFORMATION

(71) Applicant: Zoox, Inc., Foster City, CA (US)

(72) Inventors: Andre Zacarias Sanchez, Menlo Park, CA (US); Paul Lawrence Virost, Belmont, CA (US)

(73) Assignee: Zoox, Inc., Foster City, CA (US)

( * ) Notice: Subject to any disclaimer, the term of this patent is extended or adjusted under 35 U.S.C. 154(b) by 311 days.

(21) Appl. No.: 17/950,000

(22) Filed: Sep. 21, 2022

(51) Int. Cl.
| | |
|---|---|
| *B60W 50/00* | (2006.01) |
| *B60W 50/14* | (2020.01) |
| *B60W 60/00* | (2020.01) |
| *G07C 5/02* | (2006.01) |

(52) U.S. Cl.
CPC ........ *B60W 50/14* (2013.01); *B60W 60/0015* (2020.02); *G07C 5/02* (2013.01); *B60W 2050/143* (2013.01); *B60W 2050/146* (2013.01); *B60W 2554/4026* (2020.02); *B60W 2554/4029* (2020.02)

(58) Field of Classification Search
CPC ............. B60W 50/14; B60W 60/0015; B60W 2554/4026; B60W 2554/4029; B60W 2050/143; B60W 2050/146; G07C 5/02

USPC .......................................................... 701/24
See application file for complete search history.

(56) References Cited

U.S. PATENT DOCUMENTS

| | | | |
|---|---|---|---|
| 11,945,460 B1 * | 4/2024 | Alexander | G05D 1/0088 |
| 2017/0267251 A1 * | 9/2017 | Roberts | B60W 40/09 |
| 2021/0323410 A1 * | 10/2021 | Huber | B60K 35/22 |
| 2023/0051632 A1 * | 2/2023 | Bellare | B60W 30/16 |
| 2023/0290015 A1 * | 9/2023 | Kim | G02B 27/01 |
| 2023/0311912 A1 * | 10/2023 | Cullinane | B60K 35/29 |
| | | | 701/23 |
| 2024/0010220 A1 * | 1/2024 | Kim | G07C 5/06 |
| 2024/0394823 A1 * | 11/2024 | Li | B60W 60/00253 |

* cited by examiner

*Primary Examiner* — Mahmoud S Ismail
(74) *Attorney, Agent, or Firm* — Lee & Hayes, P.C.

(57) ABSTRACT

Techniques for determining situational interpretation information are discussed herein. A vehicle computing device associated with an autonomous vehicle can receive sensor data associated with an autonomous vehicle traversing an environment. The vehicle computing device can determine, based at least in part on the sensor data a planned trajectory usable to control the autonomous vehicle in the environment. The vehicle computing device can determine, based at least in part on the planned trajectory, situational information associated with the planned trajectory. The rationalization component can determine one or more indicators representing the situational information associated with the autonomous vehicle. A display device can display the one or more indicators.

18 Claims, 11 Drawing Sheets

SYSTEMS AND METHODS FOR DETERMINING SITUATIONAL INTERPRETATION INFORMATION

BACKGROUND

Ensuring safety of autonomous and semi-autonomous vehicles can sometimes be performed by having a human operator or operators in the vehicle. In these instances, it is important for information about system performance to be recorded for quality assurance, validation, and system improvement. This must be done while ensuring that the system is behaving safely, which can be accomplished through human interventions, as necessary. However, ensuring such human interventions while logging information about vehicle performance may be complex and result in missed information, inefficiencies, or, in some situations, errors.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1A:
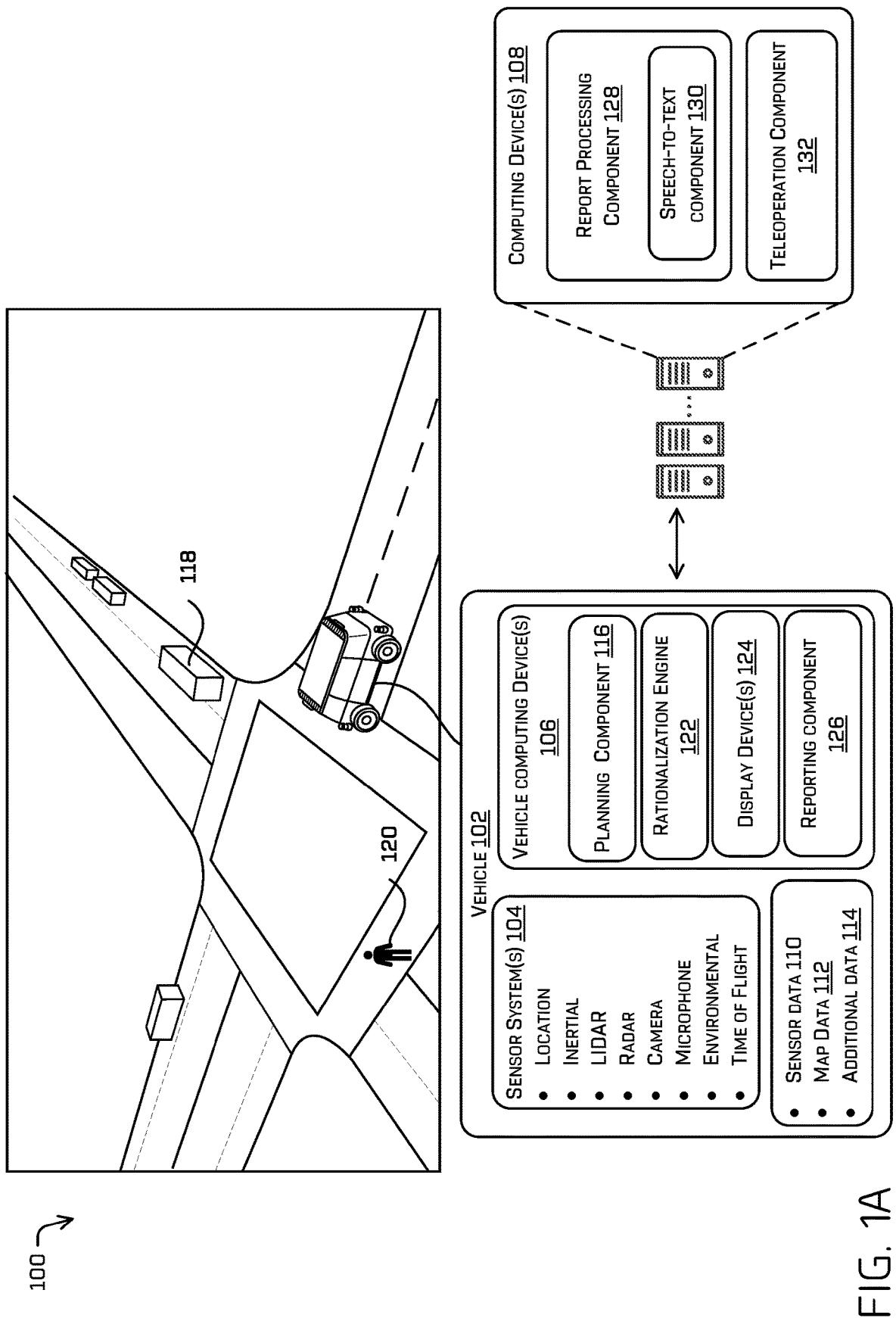
FIG. 1A is an illustration of an example environment, in which a vehicle can plan a trajectory and determine situational interpretation information according to implementations described herein.

This application describes systems and techniques for determining situation interpretation information as a vehicle traverses an environment and presenting such information to an operator of the vehicle. Autonomous vehicles may navigate through physical environments along planned routes or paths. For example, when an autonomous vehicle receives a request to travel to a destination location, the autonomous vehicle may navigate along a planned route from the current location of the autonomous vehicle to a destination location. While navigating, a planning component of the autonomous vehicle may generate trajectories usable to control the autonomous vehicle to traverse the environment.

Aspects of this disclosure are directed to systems and techniques for providing an operator of a vehicle under test with "situational awareness," e.g., via a display screen in the autonomous vehicle. In some instances, providing the situational awareness to the operator may obviate the need of an additional person in the vehicle during a test, while ensuring information is recorded and reducing complexity for the driver/operator such that the driver may maintain safe operation of the vehicle. That is, techniques and systems described herein may facilitate the need for only a single human to be present in a vehicle to perform testing, validation, and quality assurance for autonomous systems.

For example, in order to improve the "situational awareness" to safely navigate the autonomous vehicle in the environment, situational interpretation information (including one or more indicators) can be determined by a rationalization engine and displayed via display devices. Such situational awareness may distill complex decisions made by the autonomous system and present them to the operator/driver such that the operator is aware of the intended action of the vehicle. In such a case, the driver may anticipate or understand the operation about to be performed by the vehicle to both ensure that the operation is safe, as well as to ensure the vehicle is performing in accordance with the proposed maneuver.

In various examples, the operator can provide information about the actions of the vehicle such as a callout message describing operation of the autonomous system (e.g., missed detections, incorrect determinations, wrong action taken, etc.). Moreover, in some examples, disengagement may occur in which the autonomous vehicle may switch to a manual mode. The callout messages and the disengagement reports can be received, recorded, and transmitted to a remote computing device for further analysis.

As described herein, disengagement may refer to an operator's action of overriding the vehicle. For example, disengagement can occur when the operator grabs or moves a steering wheel, actuates an accelerator, engages a brake, unbuckles a seat belt, opens a door, or otherwise interacts with one or more components of the vehicle to control an aspect of the vehicle. When disengagement happens, the operator takes over control of the vehicle, and the vehicle is forced to operate in a manual mode.

As described herein, an "operator" is a person who has the ability to manually override the autonomous control. In some examples, the operator can be seated in the vehicle and have access to manual controls, such as a steering wheel, an accelerator, a brake, a seatbelt, etc. In some examples, the operator can be remote from the vehicle. Of course, the invention is not meant to be so limiting and remote operation is contemplated as well.

Using the techniques described herein, an autonomous vehicle may receive sensor data associated with an autonomous vehicle traversing an environment, map data associated with the environment, and additional data associated with the environment. As described herein, the autonomous vehicle can include a sensor system (including a variety of sensors such as location sensors, inertial sensors, LIDAR sensors, RADAR sensors, cameras, environment sensors, time of flight, or the like) capable of capturing the sensor data as the autonomous vehicle traverses the environment. In some examples, the map data can be stored in the autonomous vehicle or can be received from a database. In some examples, the additional data can include weather data (e.g., data regarding temperature, humidity, wind speed, rain or snow, sunny or cloudy, or the like), traffic data (e.g., data regarding traffic flow, traffic speed, traffic congestion, or the like), road construction data (e.g., data regarding the ongoing road construction, or the like), regulation data (e.g., data regarding speed limit, parking regulations, or the like), data provided by a third-party such as law enforcement agency, a department of motor vehicle, and/or a safety administration that can publish and/or store reports of activities and/or incidents, and the like.

A planning component can determine, based at least in part on message data (such as the sensor data, the perception data, the control data, the map data, and the additional data), planning data representing a planned trajectory usable to control the autonomous vehicle in the environment. In various examples, the perception data can include information regarding a classification of detected objects (e.g., determine an object type), for example, whether the object is a vehicle, a pedestrian, a building, a truck, a motorcycle, a moped, or the like. In various examples, the perception data can include information regarding a vehicle state, an object state, and/or a control policy, environmental features based on the map data, and/or safety thresholds (e.g., a safety range) for a speed, an acceleration, a steering, and/or a braking action. In some examples, the object does not necessarily to be a person or a vehicle, but can be traffic signs (such as a stop sign or the like), lane lines, parking spaces, etc.

In some examples, the message data can include metadata. In various examples, the metadata can indicate an action or behavior by the vehicle (e.g., "continue to follow vehicle", "stay in lane", etc.) along the trajectory. In some examples, the planning data provided by the planning component can include metadata, usable to interpret why the planning component determines the trajectory to control the vehicle in the environment. Additional details of planning techniques are described in U.S. patent application Ser. No. 17/485,041, filed on Sep. 24, 2021, entitled "Optimization Based Planning System," which is incorporated herein by reference for all purposes. In some examples, the metadata can represent an intent of the vehicle and/or characteristics of the environment (e.g., what the vehicle is doing relative to the trajectories). In some examples, the metadata can be associated with one or more regions of a map. In some examples, the metadata can also be associated with weather, intersection information, and/or object behavior (e.g., erratic or aggressive objects). In various examples, the metadata can include time information (e.g., a time or time period) such that the vehicle behavior, the object behavior, and/or the trajectories are associated with time. For instance, the planning component can associate the planned trajectory with the metadata based on the time information. The metadata can also support the situational awareness and/or reduce disengagement events as the vehicle traverses the environment, as well as provide the operator a robust understanding of vehicle actions despite complex underlying operations. As such, the interruption of the general operation of the vehicle can be reduced (e.g., such that an operator doesn't disengage an autonomous system based on, for example, a difference in intended action between the operator and system despite both being safe).

In some examples, the planning component can send the planning data to a rationalization engine, which can be configured to determine situational interpretation information based on the various message data (such as the sensor data, the perception data, the control data, the map data, the additional data, or the like) and the planning data, or the like. For instance, the situational interpretation information can include the intended maneuver associated with the vehicle, the cause of maneuver, the upcoming maneuver associated with the vehicle, or the like. The upcoming maneuver can be a maneuver to be executed at a future time, after completion of the intended maneuver. The rationalization engine can determine one or more indicators, such as a first indicator representing the intended maneuver associated with the autonomous vehicle, a second indicator representing the cause of maneuver, a third indicator representing the upcoming maneuver, and other indicators. In some examples, the indicators can include icons, windows, boxes, images, texts, audio cues, video cues, etc.

A display device can display the one or more indicators determined by the rationalization engine. In some examples, the display device can display a visualization along with the indicators. For example, the visualization can present images of another vehicle, pedestrian, etc. sensed in the vicinity of the vehicle to give the operator an overview of current and future vehicle operations, causes for the vehicle to take a current action relative to one or more objects, or the like. In some examples, the visualization can show an object with additional visual effects (or audio effects) to indicate that the planning component is not certain about the state and/or characteristic of the object. For example, the visualization can present a truck in a flickering manner as the vehicle passes the truck, indicating that the planning component is not certain about the state and/or characteristics of the truck.

In various examples, the techniques described herein allow for interaction by the operator to provide information about the actions of the vehicle. For instance, the autonomous vehicle can receive a callout message from the operator describing operation of the autonomous system (e.g., missed detections, incorrect determinations, wrong action taken, etc. as will be described in detail herein). For example, the autonomous vehicle can record an audio callout message from the operator in the autonomous vehicle. The autonomous vehicle can associate, as a report, one or more of at least a portion of the sensor data, the planned trajectory, the object, or the intended maneuver with the audio callout message. The callout message can be transmitted to a remote computing system for further analysis (and/or analyzed locally). The remote computing system can determine, as a note, one or more of speech-to-text or natural language processing on the audio message. The report can be associated with the note. For example, the remote computing system can covert the audio callout message into a text message using one or more of speech-to-text or natural language processing.

In some examples, under various circumstances, the disengagement event may occur, and the vehicle can be switched to a manual mode. For example, the disengagement event may occur, when the vehicle makes an illegal left turn when the maneuver of the vehicle does not match an expectation of the operator, when the operator feels that the control is unsafe, or the like. In some examples, the autonomous vehicle can determine that a disengagement event occurs. Upon determining that the disengagement event occurs, the vehicle can determine an indicator indicating that the autonomous vehicle is in a manual mode, and an indicator requesting a disengagement report. The vehicle can display such indicators via the display device. In some examples, the vehicle can receive an audio message and can record the audio message to be at least a part of the disengagement report.

In some examples, the vehicle can send the disengagement report to a remote computing system for downstream analysis. In some examples, the remote computing system can categorize the disengagement event based at least in part on the disengagement report. In some examples, the disengagement report can be associated with one or more labels (such as a hashtag or the like). In some examples, the remote computing system can transcribe the audio message to generate a transcribed text and present the disengagement report via an application programming interface (API) which, in some examples, may use natural language processing techniques to help categorize the source of the error or reason for the callout. In some examples, a user such as a software engineer can improve the software for controlling the autonomous vehicle based on the callouts. For example, the user can query the callout data based on the labels to retrieve all the disengagement reports classified as "follow on lead."

In some examples, the callout message can include a teleoperation request. For example, a teleoperator who is a remote assistant can perform the remote operation (teleoperation). In various examples, the teleoperator may not drive the autonomous vehicle, but can help to interpret a situation when the vehicle is misunderstanding the situation. For example, the autonomous vehicle may be stuck behind a vehicle, which is parked, but the autonomous vehicle takes the car as a driving car and tries to follow the car. In such a case, the autonomous vehicle, e.g., in response to an operator disengagement report, can send a teleoperation request to a remote computing system requesting assistance. The autonomous vehicle can display, via the display device, an indicator indicating that the autonomous vehicle is calling the remote computing system. Upon determining that the remote computing system is monitoring the autonomous vehicle, the autonomous vehicle can display, via the display device, an indicator indicating that the remote computing system is monitoring the autonomous vehicle. As such, the operator can understand that the teleoperator is working on the situation, and can wait for a period of time before taking action (such as disengagement). In some examples, the teleoperator can interpret the situation and a teleoperation component of the remote computing system can send a response message to the autonomous vehicle. In some examples, if the teleoperator cannot interpret the situation, the teleoperation component can return a suggestion of disengagement. In some examples, the teleoperation component can send a suggestion to the autonomous vehicle, indicating that one or more maneuvers can be taken. For example, the teleoperator may figure out that there is an obstruction in the road and can return a suggestion that the operator makes one or more maneuvers (e.g., shift into reverse, shift into drive, or the like) to get around the obstruction. The vehicle can display the response message and/or suggestions via the display device.

The techniques discussed herein can improve the testing procedure of the autonomous vehicle. Aspects of this disclosure can provide the operator with "situational awareness," e.g., via a display screen in the autonomous vehicle. That is, techniques and systems described herein may allow a single human in the vehicle to perform a mission. By providing situational information via a display and allowing the operator to view the situational information herself/himself, such testing procedure can be conducted by a single human efficiently.

The techniques discussed herein can improve a functioning of a vehicle computing device in a number of ways. Utilizing a rationalization engine by a vehicle computing device as described herein can support the situational awareness and/or reduce disengagement events as the vehicle traverses the environment, as well as provide the operator a robust understanding of vehicle actions despite complex underlying operations. As such, the interruption of the general operation of the vehicle can be reduced (e.g., such that an operator doesn't disengage an autonomous system based on, for example, a difference in intended action between the operator and system despite both being safe). By efficiently decoding information included in various data (such as the sensor data, the perception data, the control data, the map data, the additional data, the planning data, or the like), the computational load to determine situational information can be reduced, thereby improving the functioning of the vehicle computing device. Thus, the techniques discussed herein may improve the functioning of the vehicle computing device by saving computational resources used to determine situational information for the vehicle in the environment.

The techniques discussed herein may also improve a functioning of a vehicle computing device by presenting situational interpretation information to the operator and collecting disengagement information. For instance, presenting the intended maneuver of the vehicle action and reasons why the vehicle takes the action can improve situational awareness of the operator and thus improve safety. Furthermore, such techniques may be used, for example, to validate the safe operation of a vehicle. As a non-limiting example, by performing the techniques herein, whether the vehicle operations as expected in various scenarios may be validated. In addition, the disengagement information can be used to improve accuracy of the vehicle controller (e.g., improve debugging by identifying scenarios which contributed to the problematic vehicle behavior that should be modified). In some examples, unnecessary disengagement of the vehicle can be reduced by presenting the situational interpretation information, based on evaluating specific reasons or conditions in the environment around the vehicle that led to a vehicle action.

The techniques described herein can be implemented in a number of ways. Example implementations are provided below with reference to the following figures. Although discussed in the context of an autonomous vehicle, the methods, apparatuses, and systems described herein can be applied to a variety of systems and are not limited to autonomous vehicles. In another example, the techniques can be utilized in an aviation or nautical context, or in any system using sensor data. Further, although discussed in the context of lidar data, the techniques that can be applicable to any type of sensor data are not limited to specific examples discussed herein. Additionally, the techniques described herein can be used with real data (e.g., captured using sensor(s)), simulated data (e.g., generated by a simulator), or any combination of the two.

FIG. 1A is an illustration of an example environment 100, in which a vehicle 102 can plan a trajectory and determine situational interpretation information according to implementations described herein. For the purpose of illustration, the vehicle 102 can be configured to operate according to a Level 3 classification issued by the U.S. National Highway Traffic Safety Administration, which describes the vehicle of Level 3 as having "environmental detection" capabilities and can make informed decisions for themselves, such as accelerating past a slow-moving vehicle, but they still require human override.

As illustrated, the vehicle 102 can include one or more sensor system(s) 104. In at least one example, the sensor system(s) 104 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 104 may provide sensor data 110 to the vehicle computing device 106. Additionally, or in the alternative, the sensor system(s) 104 may send the sensor data 110, to one or more computing device(s) 108 at a particular frequency, after a lapse of a predetermined period of time, in near real-time, etc. In various examples, the vehicle 102 may be configured to transmit and/or receive data from other autonomous vehicles (e.g., one or more autonomous vehicles in a fleet) and/or the sensors.

In some instances, the vehicle 102 can comprise map data 112 associated with the environment 100, and additional data 114 such as weather data (e.g., data regarding temperature, humidity, wind speed, rain or snow, sunny or cloudy, or the like), traffic data (e.g., data regarding traffic flow, traffic speed, traffic congestion, or the like), road construction data (e.g., data regarding the ongoing road construction, or the like), regulation data (e.g., data regarding speed limit, parking regulations, or the like), data provided by a third-party such as law enforcement agency, a department of motor vehicle, and/or a safety administration that can publish and/or store reports of activities and/or incidents, and the like.

The vehicle 102 can include one or more vehicle computing devices 106. The vehicle computing device(s) 106 can include a planning component 116. The planning component 116 can determine planning data based on the sensor data 110 associated with the vehicle 102 captured by the sensor system 104, the map data 112 associated with the environment 100, and/or the additional data 114. In some examples, the planning component 116 can update the planning data at a fervency (e.g., 10 hertz). In some examples, the planning data of the planning component 116 can include trajectory data representing a planned trajectory usable to control the vehicle 102 in the environment 100 and metadata. In some examples, the planned trajectory can be partitioned into segments spatially or temporally.

The planning component 116 can implement one or more models (e.g., a machine learned model, a decision tree, a combination thereof, or the like) to process the sensor data 110 associated with the vehicle 102 captured by the sensor system 104, the map data 112 associated with the environment 100, and/or the additional data 114 to determine the trajectory data. In some instances, the planning component 116 can identify the vehicle 102 and the object 118, and the pedestrian 120 in the environment based on sensor data, map data, vehicle state data, object state data, rules of the road data describing right of way, historical data relating to changes in the vehicle state or the object state over time, etc. In some instances, the planning component 116 can identify the mode in which the vehicle 102 operates such as an autonomy mode, a manual mode, or the like. In some instances, the planning component 116 can determine a planned trajectory for the vehicle 102 to follow in the environment 100, for example, relative to the object 118 and the pedestrian 120. In some instances, the planning component 116 can determine trajectories for the vehicle 102 to use based at least in part on executing a tree search, a machine learning model, or a combination thereof. Additional details of planning techniques are described in U.S. patent application Ser. No. 17/485,041, filed on Sep. 24, 2021, entitled "Optimization Based Planning System," which is incorporated herein by reference for all purposes.

In various examples, the output data from the perception system can include information regarding a classification of detected objects (e.g., determine an object type), such as, for example, whether the object is a vehicle, a pedestrian, a building, a truck, a motorcycle, a moped, or the like. The objects may include static objects (e.g., buildings, bridges, signs, etc.) and dynamic objects such as other vehicles, pedestrians, bicyclists, or the like. In some examples, the classification of detected objects may include another vehicle (e.g., a car, a pick-up truck, a semi-trailer truck, a tractor, a bus, a train, etc.), a pedestrian, a child, a bicyclist, a skateboarder, an equestrian, an animal, or the like. In various examples, the classification of detected objects may be used to determine object characteristics (e.g., maximum speed, acceleration, maneuverability, etc.).

In various examples, the planning data of the planning component 116 can include information regarding a vehicle state (current drive mode, current drive state, planned maneuver, total velocity, total acceleration, longitudinal acceleration, lateral acceleration, distance to an intersection, longitudinal acceleration, lateral acceleration, position data, coordinate data, orientation data, x-y-z coordinates, pitch, roll, yaw, yaw rate, Euclidian position, and the like), an object state (position, velocity, acceleration, trajectory, etc.), and/or a control policy (e.g., a policy that controls the vehicle to stay in a lane or maintain a distance between the vehicle 102 and another object), environmental features based on the map data and/or safety thresholds (e.g., a safety range) for a speed, an acceleration, a steering, and/or a braking action.

In some examples, the message data can include metadata. In some examples, the metadata can represent actions or maneuvers to be performed by the vehicle 102 (e.g., "continue to follow vehicle", "stay in lane", etc.) along the trajectory. In some examples, the metadata can include information usable to interpret why the planning component 116 determines the trajectory to control the vehicle 102 in the environment 100. In some examples, the metadata can represent an intent of the vehicle 102 and/or characteristics of the environment. In some examples, the metadata can be associated with one or more regions of a map. In some examples, the metadata can also be associated with weather, intersection information, and/or object behavior (e.g., erratic or aggressive objects). In various examples, the metadata can include time information (e.g., a time or time period) such that the vehicle behavior, the object behavior, and/or the trajectories are associated with time. For instance, the planning component 116 can associate the planned trajectory with the metadata based on the time information. In some examples, the metadata can indicate that the planning component 116 is not certain about the state and/or characteristics of the object.

In various examples, the metadata can include a series of subgoals associated with the trajectory. In some examples, the trajectory can be partitioned into segments, and an individual segment of the trajectory can have at least one subgoal. For example, the subgoals can include but are not limited to, "following a car," "stopping the vehicle near an end of the route," "stopping or slowing down the vehicle when approaching pedestrians or crosswalks," "stopping the vehicle to yield to an adjacent agent," "falling behind other vehicles in adjacent lanes when preparing for a lane change," "slowing down when preparing for parking," "determining when and where the vehicle should stop and creep when passing a double parked vehicle in an oncoming lane," "stopping the vehicle when there is an object blocking the lane," or the like. Note that such subgoals are examples rather than limitations, and there can be other subgoals useful to navigate the vehicle 102 along the trajectory in the environment 100.

In some examples, the vehicle computing device 106 can store the various message data and the planning data in a database, memory, or other storage location. For example, the planning component 116 can log the various message data (e.g., record data over time) and the planning data for later use. In various examples, logging the various message data and the planning data can occur as the vehicle 102 navigates in the environment 100.

As noted above, in examples of this disclosure the vehicle 102 may include autonomous functionality. Such autonomous functionality may be tested in a number of ways, including through real-world testing in which one or more operators are in the vehicle 102 to intervene in response to an event, such as an unsafe maneuver, an unforeseen scenario, and/or the like. Aspects of this disclosure may include providing a visual output for the operator that may be readily interpreted by the operator to understand the vehicle functioning, e.g., without the need for an additional operator. Aspects of this disclosure may also or alternatively include (automatically) facilitating the creation and/or transmission of callout reports and/or reports, e.g., upon the operator overriding autonomous functionality. For example, the vehicle computing device(s) 106 can include a rationalization engine 122, one or more display devices 124, and a reporting component 126.

In some examples, the rationalization engine 122 can receive input from multiple systems, such as the planning component 116, the perception system, the sensor system, the control system, or the like. The rationalization engine 122 can semantically decode information included in the input from multiple systems, and determine situational interpretation information based on the various message data (such as the sensor data, the perception data, the control data, the map data, the additional data, or the like) and the planning data. Additional details of planning techniques are described in U.S. patent application Ser. No. 17/485,041, filed on Sep. 24, 2021, entitled "Optimization Based Planning System," which is incorporated herein by reference for all purposes. For instance, the situational interpretation information can include the intended maneuver associated with the vehicle 102, the cause of maneuver, the upcoming maneuver associated with the vehicle 102, or the like.

The rationalization engine 122 can determine the intended maneuver associated with the vehicle 102 and the cause of maneuver based on input from multiple systems, such as the planning data received from the planning component 116. As described above, the planning data from the planning component 116 can include trajectory data representing a planned trajectory and associated metadata.

In some examples, the trajectory can be partitioned into segments, an individual segment can have at least one subgoal. In some instances, the rationalization engine 122 can determine the intended maneuver type and/or cause of maneuver based at least in part on the subgoals. For example, the metadata can indicate that for a segment of trajectory, a subgoal is "stopping the vehicle near an end of route." The rationalization engine 122 can determine that, for that segment of trajectory, the intended maneuver type is "stop," and the cause of maneuver is "end of route." In some examples, the rationalization engine 122 can determine multiple intended maneuver types for one subgoal. For example, for a segment of trajectory, the metadata can indicate that a subgoal is "stopping or slowing down the vehicle when approaching pedestrians or crosswalks." The rationalization engine 122 can determine that, for that segment of trajectory, the intended maneuver types are "caution" and "yield," and the cause of maneuver is "pedestrian," indicating that the vehicle is stopping or yielding because there is a pedestrian. In some instances, there can be a mapping relationship between subgoals, the intended maneuvers, and the cause of maneuver, and the mapping relationship can be stored in a file in a database. In some instances, the rationalization engine 122 can determine intended maneuvers and causes of maneuver based on subgoals by performing a tree search or implementing a machine learned model, a combination thereof, or the like.

As another examples, the planning data from the planning component 116 can be generated based on tree searching without subgoals. For example, the planning component 116 can plan a maneuver for the vehicle 102 at a certain time point, such as whether to stay in lane, whether to change lanes, or the like based on tree searching techniques. Additional details of tree search techniques are described in U.S. patent application Ser. No. 17/485,041, filed on Sep. 24, 2021, entitled "Optimization Based Planning System," which is incorporated herein by reference for all purposes. The rationalization engine 122 can determine intended maneuvers and causes of maneuver based on the planning data from the planning component 116 without using subgoals.

The rationalization engine 122 can determine the upcoming maneuver associated with the vehicle 102 based on the message data received from the planning component 116. As described above, the metadata associated with the message data can represent actions or maneuvers to be performed by the vehicle 102 (e.g., "continue to follow vehicle", "stay in lane", etc.) along the trajectory. For example, the rationalization engine 122 can determine the upcoming maneuver based on the metadata.

The rationalization engine 122 can make various determinations, based on various message data (such as the sensor data 110, the perception data, the control data, the map data 112, the additional data 114, or the like) and the planning data. In some examples, the rationalization engine 122 can determine a mode of the vehicle 102. For example, disengagement can occur in various circumstances, such as when the operator grabs the steering wheel, hits the accelerator, hits the brake, unbuckles the seat belt, opens the door, or the like. In some examples, when disengagement happens, the vehicle can be forced to operate in a manual mode. For example, the perception data can include data indicating a mode of the vehicle. In such cases, the rationalization engine 122 can determine that the vehicle 102 is in a manual mode based on the perception data. Additionally, after disengagement occurs, the rationalization engine 122 can determine whether autonomy is ready to be engaged based on rules. For example, if the vehicle is partially into a crosswalk and there is a red light, the autonomy is not ready to be engaged. In some examples, the rationalization engine 122 can make other determinations, such as recording is going on, a remote operation is going on, and so on.

The rationalization engine 122 can determine one or more indicators, interpreting the situation associated with the vehicle 102. For example, the indicators can include, but are not limited to, an indicator indicating an intended maneuver of the vehicle 102, an indicator indicating a cause of maneuver, an indicator indicating an upcoming maneuver of the vehicle 102, an indicator indicating a mode of the vehicle 102, an indicator indicating whether autonomy is ready to be engaged, an indicator indicating that recording is going on, an indicator indicating that remote operation is going on, or the like. In some examples, the indicators can include icons, windows, boxes, images, texts, audio cues, video cues, etc. For example, the rationalization engine 122 can generate popup boxes indicating a cause of maneuver under some circumstances. As an example, when the vehicle makes a harsh braking action, and the rationalization engine 122 can generate a popup box with the information "sorry, but the vehicle needed to yield to an unexpected pedestrian crossing" to interpret the cause of the situation. In some examples, the popup box can be displayed in iconography without text. Additional details of the indicators are provided throughout this disclosure.

The vehicle computing device(s) 106 can include the one or more display devices 124. In some examples, the display device(s) 124 can be positioned to be visible by the operator, but not distract the operator. In some examples, the display device(s) 124 can include but are not limited to, liquid crystal display (LCD), touch screen, flat panel display, light emitting diode (LED) monitor, or the like. In some examples, the display device(s) 124 can be configured to display a user interface (UI). In some examples, the UI can include one or more visualizations of a scene of the environment 100. In some examples, the display device(s) 124 can display a first visualization of the scene of the environment 100 in a detailed manner. For example, the first visualization can present images of the vehicle, the trajectory of the vehicle, traffic signals (red light, green light, stop sign, or the like), one or more objects (e.g., a vehicle, a pedestrian, a bicyclist, an animal, or the like), predicted paths of the objects, map markers (lanes, sidewalks, junctions, highways, crosswalks, and the like), characteristics of the environment, or the like.

The display device(s) 124 can display a second visualization of the scene of the environment 100 in a simplified manner. In some examples, the second visualization can include a reduced number of elements compared to the first visualization. For example, the second visualization can present images of another vehicle, pedestrian, etc. sensed in the vicinity of the vehicle 102 to give the operator a simplified overview of current and future vehicle operations, causes for the vehicle 102 to take a current action relative to one or more objects, or the like. Therefore, the safety of the vehicle 102, the objects around the vehicle 102, and the operating environment can be improved. In some examples, the first visualization and the second visualization can be displayed on the same display device. Additionally or alternatively, the first visualization and the second visualization can be displayed on separate display devices.

In some examples, the second visualization can display an object with additional visual effects (or audio effects) to indicate that the planning component 116 is not certain about the state and/or characteristic of the object. For example, the second visualization can present a truck in a flickering manner as the vehicle 102 passes the truck, indicating that the planning component 116 is not certain about the state and/or characteristics of the truck. As such, the operator can be cautious about the object as the vehicle 102 follows the trajectory in the environment 100. Note that flickering is an example rather than limitations, and other manners (e.g., changing color, highlighting, audio effects, or the like) can be used to indicate an unsure state of the object.

The display device(s) 124 can display the situational interpretation information determined by the rationalization engine 122. In some examples, the situational interpretation information can provide a context of the current and future vehicle behavior, the cause for the vehicle behavior, or the like. In some examples, under some circumstances, the operator may notice that the vehicle 102 makes a move that is not expected and can look at the display device(s) 124 for situational interpretation information to understand the vehicle behavior. As a non-limiting example, the operator may expect the vehicle 102 is going to slow down, but the vehicle is actually speeding up. In that case, the operator may look at the display device(s) 124, and situational interpretation information shows that the vehicle is merging. Then, the operator may understand why the vehicle is speeding up rather than slowing down. In some examples, the situational interpretation information displayed by the display device(s) 124 can include one or more indicators determined by the rationalization engine 122, or the like. As described herein, the situational interpretation information can be useful to maintain situational awareness of the operator, and the safety of vehicle occupants, the vehicle itself, and the operating environment can be improved.

The display device(s) 124 can display popup boxes in some circumstances. As an example, when the vehicle makes a harsh braking action, and display device(s) 124 can display a popup box with the information "sorry, but the vehicle needed to yield to an unexpected pedestrian crossing" to interpret the reason for the situation. In some examples, the popup box can be displayed in iconography without text.

The display device(s) 124 can provide the operator with "situational awareness," by presenting the visualization and indicators. That is, a single human in the vehicle can conduct the testing mission of the autonomous vehicle. Moreover, the display device(s) 124 can display consistent information under the same situation.

The vehicle computing device(s) 106 can include a reporting component 126. In various examples, the techniques described herein allow for interaction by the operator to provide information about the actions of the vehicle. For instance, the autonomous vehicle can receive a callout message/report from the operator describing operation of the autonomous system (e.g., missed detections, incorrect determinations, wrong action taken, etc. as will be described in detail herein).

Moreover, in some examples, disengagement may occur when the operator uses a command and/or an action to take over the control of the vehicle. As described herein, disengagement may refer to an operator's command and/or action of overriding the vehicle. For example, disengagement can occur when the operator grabs the steering wheel, hits the accelerator, hits the brake, unbuckles the seat belt, opens the door, etc. When disengagement happens, the operator may take over control of the vehicle. For example, the vehicle may be operated in a manual mode after the disengagement event. Under various circumstances, the disengagement event may occur when the vehicle is performing some action that is not safe or when the operator believes that the vehicle is performing in an unsafe manner. For example, the disengagement event may occur, when the vehicle 102 makes an illegal left turn, when the maneuver of the vehicle 102 does not match an expectation of the operator, when the operator feels uncomfortable, or the like. As detailed herein, the information provided to the operator via the display device(s) 124 can assist the operator to understand the functioning of the vehicle, which may reduce instances in which the operator believes the functioning of the vehicle to be unsafe, but when in fact the functioning is appropriate for the circumstances, e.g., the operator has misunderstood the surroundings and/or the "intent" of the vehicle 102.

As described herein, the sensor system 104 can determine that a disengagement event occurs. In that case, the display device(s) 124 can display an indicator indicating that the vehicle 102 is in manual mode. The display device(s) 124 can also display an indicator requesting a disengagement report. In some examples, the reporting component 126 can receive the callout report and/or the disengagement report.

In some examples, the callout report and/or the disengagement report can be input by the operator in various ways such as via an audio device, a keyboard, a mouse, a touch pad, a touch screen, a tablet, a camera, or the like. In some examples, callout report and/or the disengagement report can include audio messages, text messages, gesture messages, or the like. As a non-limiting example, the operator can press a button, e.g., disposed on a steering wheel, dashboard, or the like, to start/end the recording of an audio message, and speak to the microphone of the sensor system(s) 104. The audio message can be included as at least a part of the callout report and/or the disengagement report. The reporting component 126 can receive and record the audio message to be at least a part of the callout report and/or the disengagement report. In some examples, the callout report and/or the disengagement report can be stored in the form of an audio file, a text file, an image file, a video file, a combination thereof, and so on.

In some examples, the disengagement report can include information regarding a time of the disengagement event, a comment on the disengagement event, or a classification label (such as a hashtag, or the like), or the like. The classification label can indicate the classification of the disengagement event. For example, if the disengagement event happens when the vehicle is following an object, the disengagement event can be classified as "follow on lead." As a non-limiting example, a disengagement report can include the following information: the time is 2022-05-25; the comment for disengagement is that the vehicle is under braking (to run farther than normal without applying sufficient brake); a classification label "#follow on lead" (meaning that the vehicle is following an object). In some examples, the classification label can begin with a symbol (such as a hashtag "#") to indicate that the following word(s) is a classification label. In some examples, the classification label can be input by typing, verbal cues, gestures, or the like. In some examples, the classification label can be automatically generated based on the information in the disengagement report. As will be appreciated, certain information in the disengagement report can be generated, e.g., automatically, by the vehicle 102, whereas other information in the disengagement report can be received via user input.

After the disengagement event occurs, the vehicle computing device 106 can determine whether the vehicle 102 is ready for autonomous control again. In some examples, upon determining that the vehicle 102 is ready to be engaged, the vehicle computing device(s) 106 can display, via the display device(s) 124, an indicator, indicating that an autonomy mode is ready to be engaged. Additionally or alternatively, upon determining that the vehicle 102 is not ready to be engaged, the vehicle computing device(s) 106 can display, via the display device(s) 124, an indicator, indicating that an autonomous mode is not ready to be engaged.

The vehicle computing device(s) 106 can communicate with one or more computing devices 108. In some examples, the computing device(s) 108 can be implemented as remote computing device(s). In some examples, the vehicle computing device(s) 106 can send various data to the computing device(s) 108, such as the sensor data 110 collected by the sensor system(s) 104, the map data 112 associated with the environment 100, the additional data 114, the planning data generated by the planning component 116, the situational interpretation data determined by the rationalization engine 122, the callout message/report, the disengagement report data generated by the reporting component 126, or the like. The vehicle computing device(s) 106 can associate one or more of at least a portion of the sensor data, the planned trajectory, the object, or the intended maneuver with the callout report and/or a disengagement report.

The computing device(s) 108 can include a report processing component 128 configured to process the callout report and/or the disengagement report sent from the vehicle computing device(s) 106. In some examples, the report processing component 128 can include a speech-to-text component 130 configured to transcribe a speech into a text. For example, the disengagement report can include an audio message, and the speech-to-text component 130 can transcribe the audio message into a transcribed message (such as a text message). In some examples, the disengagement report can be presented via an application programming interface (API). In some examples, the report processing component 128 can categorize the disengagement event based on the information included in the disengagement report. In some examples, a user such as an engineer can view the disengagement report via the API, and improve the controlling program of the autonomous vehicle. Such categorizations, in at least some examples, may associate the text (e.g., data for an error, disengagement, or otherwise identified by the operator) and one or more time stamps or ranges in time of operation of the vehicle and associate them in a database. As such, software engineers may subsequently query the database for examples in which the system needs improvement and message data (e.g., sensor, perception, planning, control data) may be relayed to the software engineer to further identify the issue and develop or modify software to resolve the issue.

The computing device(s) 108 can include a teleoperation component 132. In some examples, the vehicle computing device(s) 106 can send a request for teleoperation to the computing device(s) 108. In some instances, remote operation (teleoperation) may refer to the operation on a machine performed by another machine at distance. In response, the teleoperation component 132 can access the vehicle computing device(s) 106 remotely to perform the remote operation (teleoperation). For example, a teleoperator can monitor the information displayed via the display device(s) 124 on the vehicle computing device(s) 106.

When the vehicle computing device(s) 106 requests teleoperation for assistance, the vehicle computing device(s) 106 can display, via the display device(s) 124, an indicator indicating that the vehicle is calling the computing device(s) 108 for remote operation (teleoperation). In some examples, the vehicle computing device(s) 106 can detect remote operation (teleoperation) performed by the computing device(s) 108. For example, a teleoperator can access the vehicle computing device(s) 106 to monitor the behavior of the vehicle 102. In that case, the vehicle computing device(s) 106 can display, via the display device(s) 124, an indicator indicating that the remote operation (teleoperation) is going on.

The vehicle computing device(s) 106 can receive a response message from the computing device(s) 108. In some examples, the response message can include a situational interpretation, a suggestion of disengagement, or a suggestion of one or more maneuvers. The vehicle computing device(s) 106 can display the response message via the display device(s) 124. In some instances, the operator can request help from the teleoperator when the operator cannot understand the vehicle behavior. In response, the teleoperator can engage with the vehicle computing device(s) to review the situation and information related to the vehicle behavior. In some instances, the teleoperator can interpret the situation and the teleoperation component 446 can send a response message to the vehicle computing device(s) 106 to interpret the situation. In some instances, the teleoperator may figure out that there is a failure of the vehicle 102 and the teleoperation component 446 can send a suggestion for the operator to disengage the vehicle 102. In some instances, the teleoperator may figure out that there is an obstruction in the road and the teleoperation component 446 can send return a suggestion that the operator makes one or more maneuvers (e.g., shift into reverse, shift into drive, or the like) to get around of the obstruction.

Figure 1B:
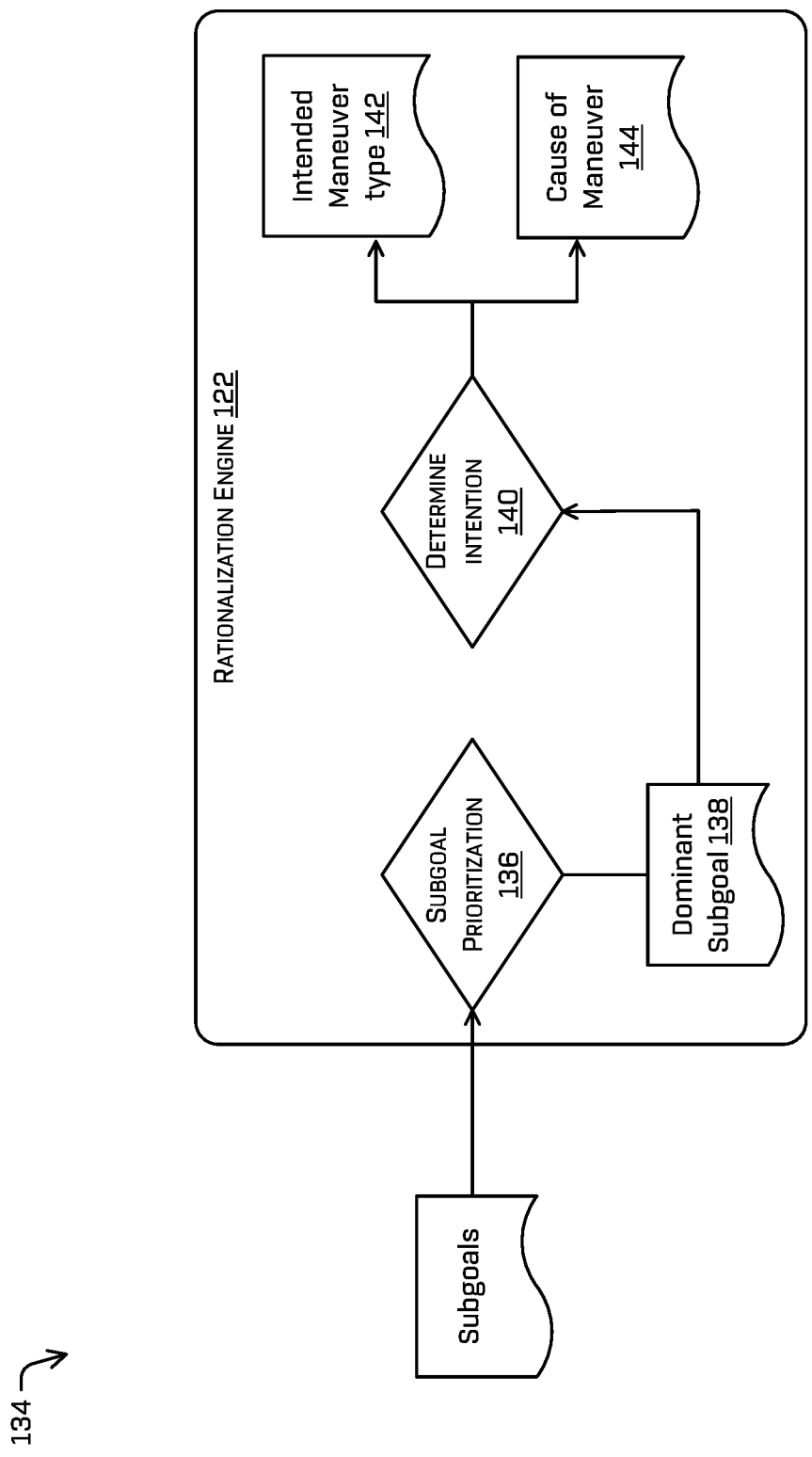
FIG. 1B is an illustration of an example of how the rationalization engine determines the intended maneuver type and the cause of maneuver based on subgoals in accordance with implementations of this disclosure.

FIG. 1B is an illustration of an example 134 of how the rationalization engine 122 determines the intended maneuver type and the cause of maneuver based on subgoals in accordance with implementations of this disclosure. Note that the example shown in FIG. 1B is for illustrative purpose rather than limiting, and there may be other methods to determine intended maneuvers and the causes of maneuver. As described above, the trajectory can be partitioned into segments, and an individual segment of the trajectory can have at least one subgoal. In some examples, the subgoals can be included in the planning data generated by the planning component 116, and the subgoals can be sent to the rationalization engine 122 along with other data.

At 136, the rationalization engine 122 can perform subgoal prioritization to choose a dominant subgoal 138. In some examples, a segment of trajectory can have multiple subgoals, and the rationalization engine 122 can implement suitable algorithm to pick a subgoal as the dominant subgoal 138. In some instances, to produce useful situational interpretation information, the most relevant subgoal can be selected, and can be referred to as the "dominant subgoal." At 140, the rationalization engine 122 can determine the intended maneuver based on the dominant subgoal 138. In some instances, there can be a mapping relationship between subgoals and intended maneuvers and causes of maneuver, and the mapping relationship can be stored in a file. In some instances, the rationalization engine 122 can determine intended maneuvers and cause of maneuver based on subgoals by performing tree search or executing a machine learned model, or the like. Then, the rationalization engine 122 can determine the intended maneuver type 142 and the cause of maneuver 144 based on the determination.

Note that example 134 is used for illustration rather than limitations. Moreover, the rationalization engine 122 can make other determinations. Additional details regarding the functionality of the rationalization engine 122 are given throughout this disclosure.

Figure 2A:
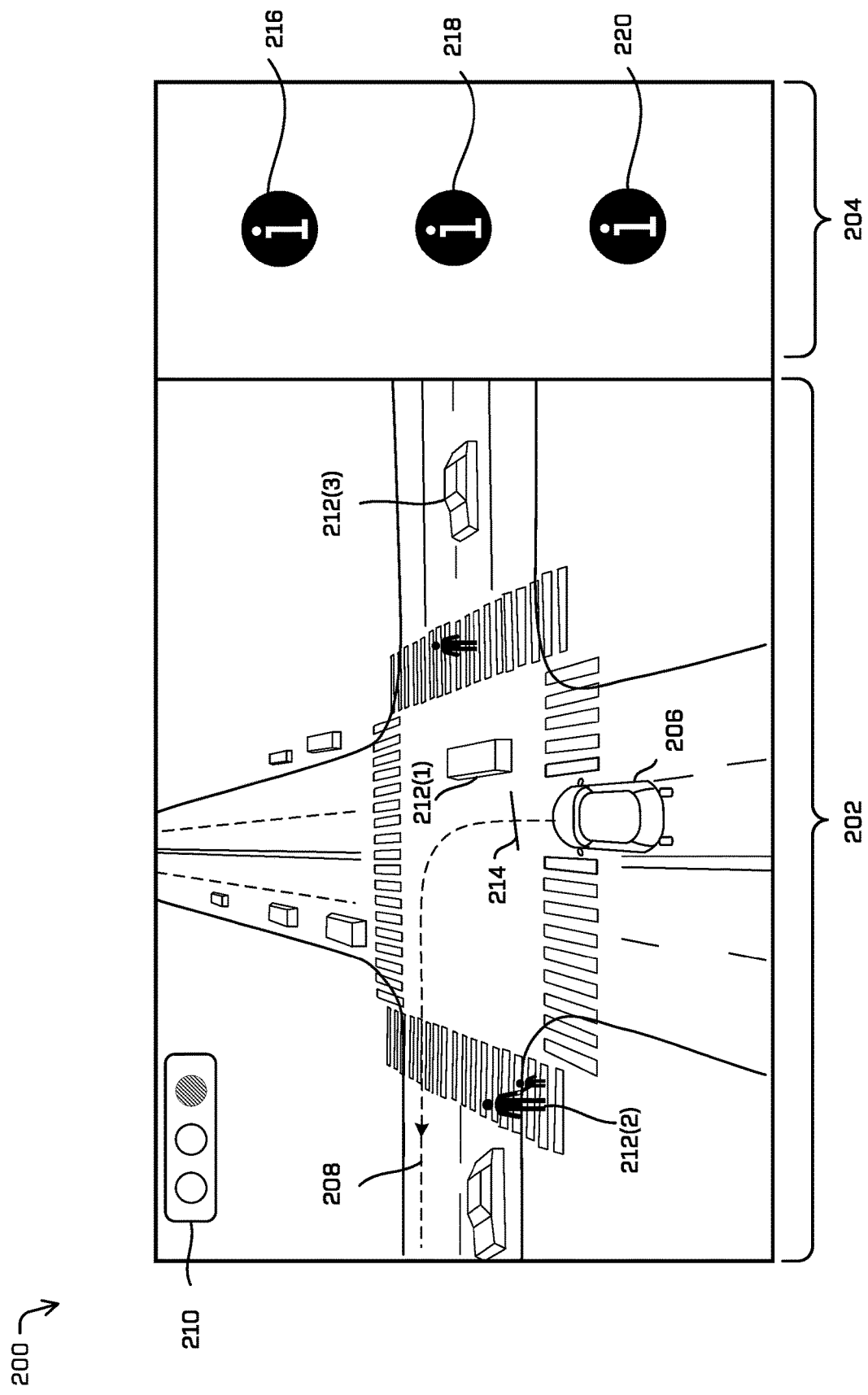
FIG. 2A is an illustration of an example user interface, which includes a visualization of a scene of the environment in which the vehicle traverses along with situational interpretation information in accordance with implementations of this disclosure.

FIG. 2A is an illustration of an example user interface 200, which include a visualization 202 of a scene of the environment in which the vehicle traverses along with situational interpretation information 204 in accordance with implementations of this disclosure. Thought the visualization 202 and the situational interpretation information 204 are shown side by side in FIG. 2A, it should be understood that this disclosure is not limited thereto. the visualization 202 and the situational interpretation information 204 can be arranged in other manners. For example, the visualization 202 and the situational interpretation information 204 can be arranged one above the other, overlap each other, or the like. In some examples, the user interface 200 can be displayed via the display device(s) 124 as described with respect to FIG. 1A. Specifically, the user interface 200 can be displayed for viewing by an operator of the vehicle 102. As described herein, an "operator" is a person who has the ability to manually override the autonomous control. In some examples, the operator can be seated in the vehicle and have access to manual controls, such as a steering wheel, an accelerator, a brake, a seatbelt, etc. In some examples, the operator can be remote from the vehicle. In some examples, the visualization 202 can include 2-dimensional (2D) visualization, 3-dimensional (3D) visualization, static visualization, dynamic visualization, any combination thereof, or the like. In some examples, the visualization 202 can present images of the vehicle 206, the trajectory 208 of the vehicle, traffic signals 210 (e.g., red light, green light, stop sign, or the like), one or more objects such as a truck 212 (1), a pedestrian 212(2), and a car 212(3) or the like, map markers (lanes, sidewalks, junctions, highways, crosswalks, and the like), or the like. Though FIG. 2A shows that the trajectory 208 in a dashed line, it should be understood that the trajectory 208 can be depicted in various manners, such as a band, a strip, an extended area, or the like. In some examples, the visualization 202 can also include a stop gate 214 which can represent a predicted stop position of the vehicle 206. Note that the visualization 202 is depicted for illustration purposes and other elements can be included. Moreover, in some examples fewer than all of the elements shown in FIG. 2A may be included.

The situational interpretation information 204 can provide a context of the current and/or future vehicle behavior, the cause for the vehicle behavior, or the like. In some examples, the situational interpretation information 204 can include icons, windows, boxes, images, texts, audio cues, video cues, or the like. In some examples, the situational interpretation information 204 can include a first indicator 216 representing the intended maneuver associated with the vehicle 206. The intended maneuver associated with the vehicle 206 can include but is not limited to "proceed," "double parked vehicle (DPV)," "lane blocked," "freeform yield," "missing data," "stopping/stopped," "caution," "yield," "follow," or the like. For example, "proceed" can indicate that the intended maneuver of vehicle 206 is to proceed. For example, "double parked vehicle (DPV)" can indicate that the intended maneuver of the vehicle 206 is to handle the double-parked vehicle. For example, "lane blocked" can indicate that the intended maneuver of the vehicle 206 to handle a blocked lane. For example, "freeform yield" can indicate that the intended maneuver of the vehicle 206 is to make a freeform yield. For example, "missing data" can indicate that the intended maneuver of the vehicle 206 cannot be determined. For example, "stopping/stopped" can indicate that the intended maneuver of the vehicle 206 is to stop. For example, "caution" can indicate that the intended maneuver of the vehicle 206 is to take caution. For example, "yield" can indicate that the intended maneuver of the vehicle 206 to yield. For example, "follow" can indicate that the intended maneuver of the vehicle 206 is to follow an object (e.g., a car, a truck, or the like).

In some examples, the situational interpretation information 204 can include a second indicator 218 representing the cause of maneuver. The cause of maneuver can include but is not limited to "pedestrian," "car," "bike," "truck," "searching for parking," "steam," "construction zone," "end of route," "NOGO," "missing data," or the like. For example, "pedestrian" can indicate that the cause of maneuver is that there is a pedestrian. For example, "car" can indicate that the cause of maneuver is that there is a car. For example, "bike" can indicate that the cause of maneuver is that there is a bike. For example, "truck" can indicate that the cause of maneuver is that there is a truck. For example, "searching for parking" can indicate that the cause of maneuver is that the vehicle 206 is searching for parking spaces. For example, "steam" can indicate that the cause of maneuver is that steam presents. In some instances, steam can be picked up as a physical object, even though it is not. Therefore, it is usable to warn the existence of steam such that the operator can understand that the vehicle is not handling steam rather than a physical object. For example, "construction zone" can indicate that the cause of maneuver is that there is a construction zone. For example, "end of route" can indicate that the cause of maneuver is that the route is coming to an end. For example, "NOGO" can indicate that the cause of maneuver is that the vehicle 206 has detected an error and will come to a stop. For example, "missing data" can indicate that the cause of maneuver is that missing.

In some examples, the situational interpretation information 204 can include a third indicator 220 representing the upcoming maneuver associated with the vehicle 206. The upcoming maneuver associated with the vehicle 206 can include but is not limited to "left turn," "right turn," "merge left," "shift into reverse," "shift into drive," or the like. For example, "left turn" can indicate that the upcoming maneuver associated with the vehicle 206 is a left turn. For example, "right turn" can indicate that the upcoming maneuver associated with the vehicle 206 is a right turn. For example, "merge left" can indicate that the upcoming maneuver associated with the vehicle 206 is to merge left. For example, "merge right" can indicate that the upcoming maneuver associated with the vehicle 206 is to merge right. For example, "shift into reverse" can indicate that the upcoming maneuver associated with the vehicle 206 is to shift into reverse. For example, "shift into drive" can indicate that the upcoming maneuver associated with the vehicle 206 is to shift into drive. In some examples, the vehicle 206 can get into situations where technically the vehicle 206 needs to back up and shift to drive again to handle the situation. In that case, the upcoming maneuver can be made in response to a teleoperator's request. For example, the teleoperator can inform the operator to shift the vehicle 206 into reverse and then back into drive to handle situations such as an obstruction on the road. The situational interpretation information 204 are all simplified such that the operator may fully understand the actions with a quick glance such that they are able to fully ensure safe operation of the vehicle.

Figure 2B:
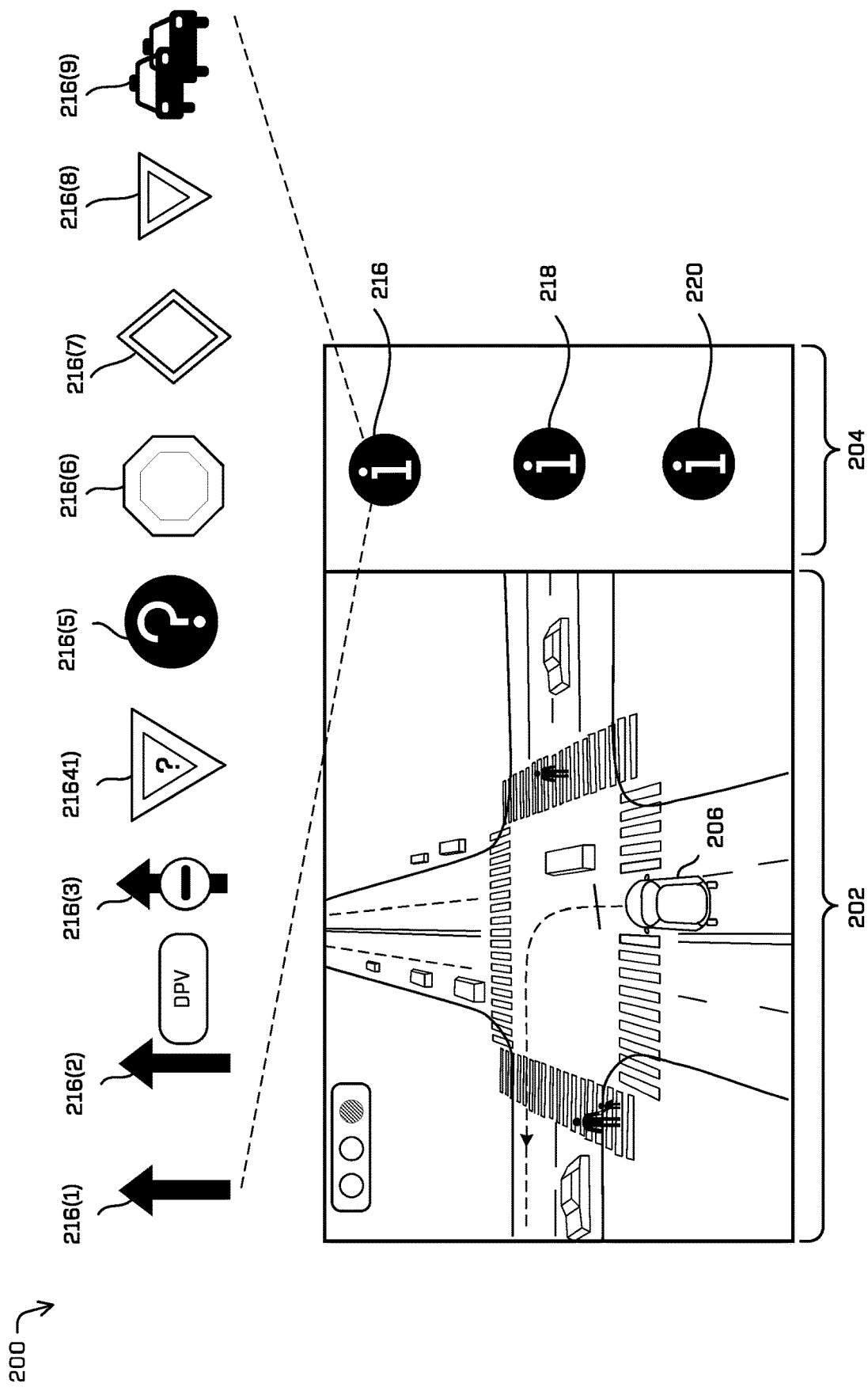
FIG. 2B is an illustration of an example user interface with examples of the first indicator representing the intended maneuver associated with the vehicle in accordance with implementations of this disclosure.

FIG. 2B is an illustration of an example user interface 200 with examples of the first indicator 216 representing the intended maneuver associated with the vehicle 206 in accordance with implementations of this disclosure. In some examples, the first indicator 216 can include various icons, such as a proceed icon 216(1), a double parked vehicle (DPV) icon 216(2), a lane blocked icon 216(3), a freeform yield icon 216(4), a missing data icon 216(5), a stopping/stopped icon 216(6), a caution icon 216(7), a yield icon 216(8), a follow icon 216(9), or the like. Note that such icons are examples rather than limitations, and other icons can be used as the first indicator 216. In examples, the icons used as the first indicator 216 (as well as icons used for other of the indicators) are intended to be readily understood by an operator of the vehicle, e.g., such that with only a quick glance at the icon the operator can readily identity the represented thing, person, movement, operation, and/or the like. Additionally or alternatively, the first indicator 216 can include windows, boxes, images, texts, audio cues, video cues, or the like.

As described herein, the icons can be graphics or symbols that are useable to represent things, persons, moves, operations, etc. For example, the proceed icon 216(1) can indicate that the intended maneuver of vehicle 206 is to proceed. For example, the double parked vehicle (DPV) icon 216(2) can indicate that the intended maneuver of the vehicle 206 is to handle the double parked vehicle. For example, the lane blocked icon 216(3) can indicate that the intended maneuver of the vehicle 206 to handle a blocked lane. For example, the freeform yield icon 216(4) can indicate that the intended maneuver of the vehicle 206 is to make a freeform yield. For example, the missing data icon 216(5) can indicate that the intended maneuver of the vehicle 206 cannot be determined. For example, the stopping/stopped icon 216(6) can indicate that the intended maneuver of the vehicle 206 is to stop. For example, the caution icon 216(7) can indicate that the intended maneuver of the vehicle 206 is to take caution. For example, the yield icon 216(8) can indicate that the intended maneuver of the vehicle 206 to yield. For example, the follow icon 216(9) can indicate that the intended maneuver of the vehicle 206 is to follow an object (e.g., a car, a truck, or the like).

Figure 2C:
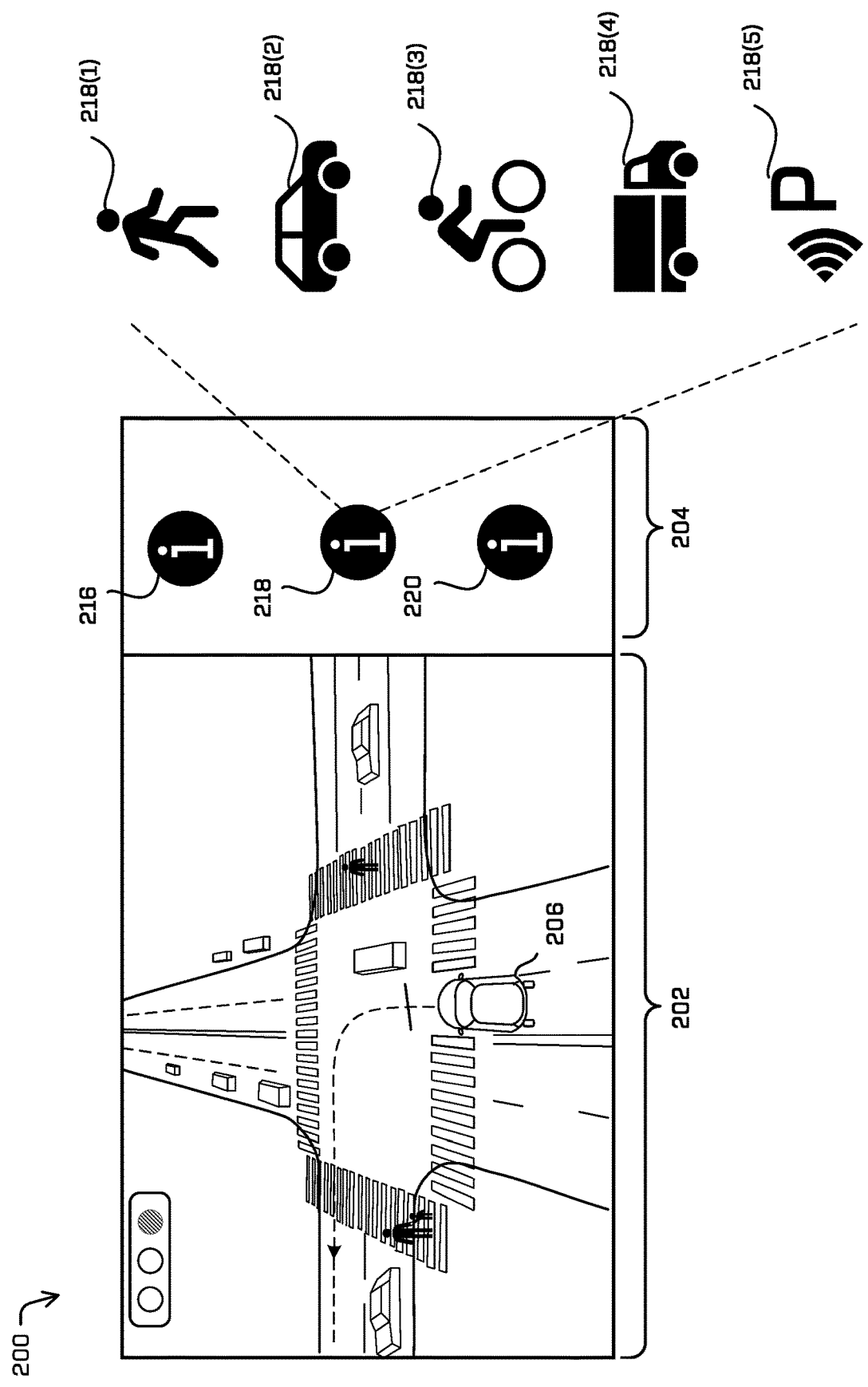
FIG. 2C is an illustration of an example user interface with examples of the second indicator representing the cause of maneuver in accordance with implementations of this disclosure.

FIG. 2C is an illustration of an example user interface 200 with examples of the second indicator 218 representing the cause of maneuver in accordance with implementations of this disclosure. In some examples, the second indicator 218 can include various icons, such as a pedestrian icon 218(1), a car icon 218(2), a bike icon 218(3), a truck icon 218(4), a searching for parking icon 218(5), or the like. Note that such icons are examples rather than limitations, and other icons can be used as the second indicator 218. Additionally or alternatively, the second indicator 218 can include windows, boxes, images, texts, audio cues, video cues, or the like.

The various icons can indicate various causes for the intended maneuver associated with the vehicle 206. For example, the pedestrian icon 218(1) can indicate that the cause of maneuver is that there is a pedestrian. For example, the car icon 218(2) can indicate that the cause of maneuver is that there is a car. For example, the bike icon 218(3) can indicate that the cause of maneuver is that there is a bike. For example, the truck icon 218(4) can indicate that the cause of maneuver is that there is a truck. For example, the searching for parking icon 218(5) can indicate that the cause of maneuver is that the vehicle 206 is searching for parking spaces.

Figure 2D:
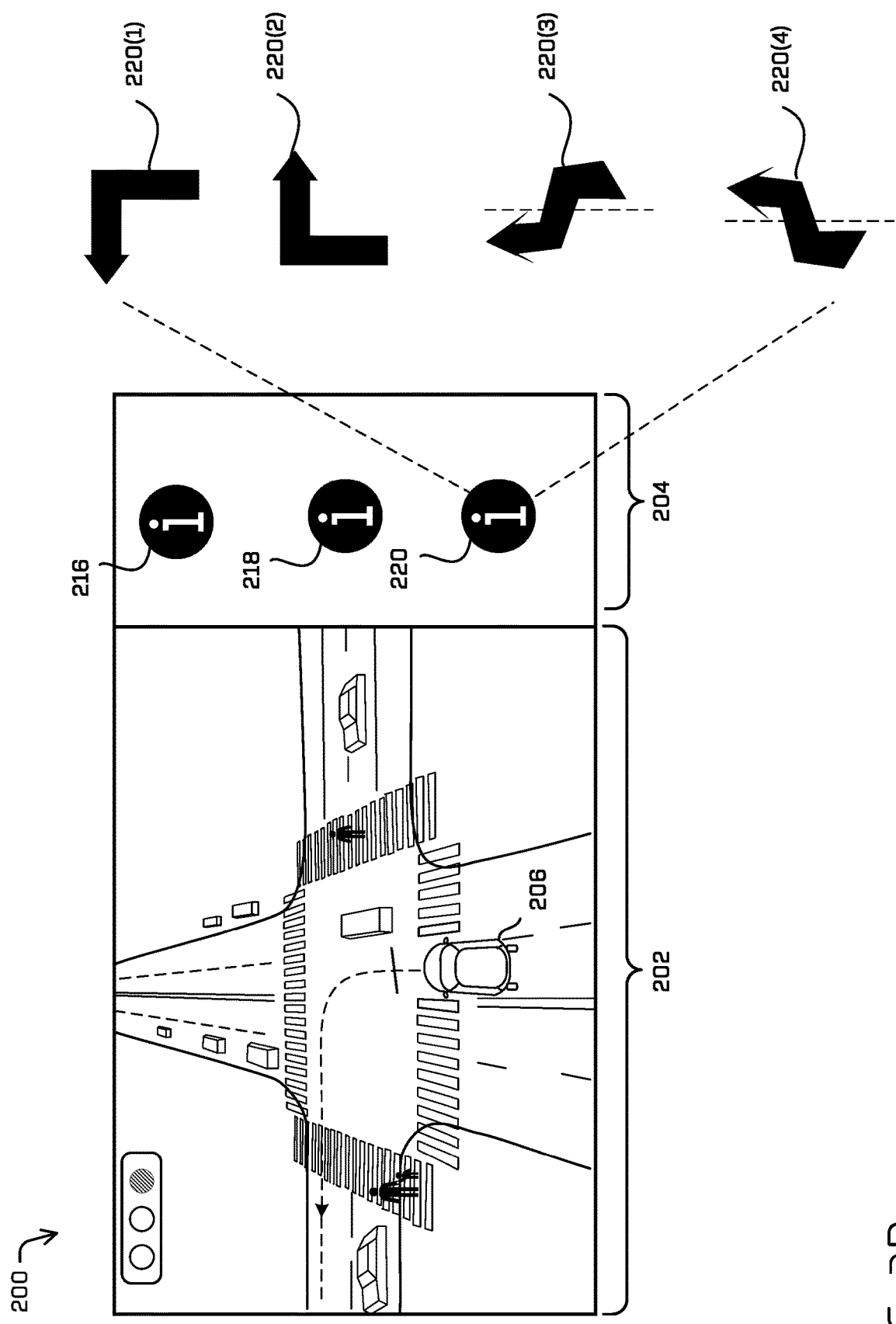
FIG. 2D is an illustration of an example user interface with examples of the third indicator representing the upcoming maneuver associated with the vehicle 206 in accordance with implementations of this disclosure.

FIG. 2D is an illustration of an example user interface 200 with examples of the third indicator 220 representing the upcoming maneuver associated with the vehicle 206 in accordance with implementations of this disclosure. In some examples, the third indicator 220 can include various icons, such as a left turn icon 220(1), a right turn icon 220(2), a merge left icon 220(3), a merge right icon 220(4), or the like. Note that such icons are examples rather than limitations, and other icons can be used as the third indicator 220. Additionally or alternatively, the third indicator 220 can include windows, boxes, images, texts, audio cues, video cues, or the like.

The various icons can indicate various upcoming maneuvers associated with the vehicle 206. For example, the left turn icon 220(1) can indicate that the upcoming maneuver associated with the vehicle 206 is a left turn. For example, the right turn icon 220(2) can indicate that the upcoming maneuver associated with the vehicle 206 is a right turn. For example, the merge left icon 220(3) can indicate that the upcoming maneuver associated with the vehicle 206 is to merge left. For example, the merge right icon 220(4) can indicate that the upcoming maneuver associated with the vehicle 206 is to merge right.

Figure 2E:
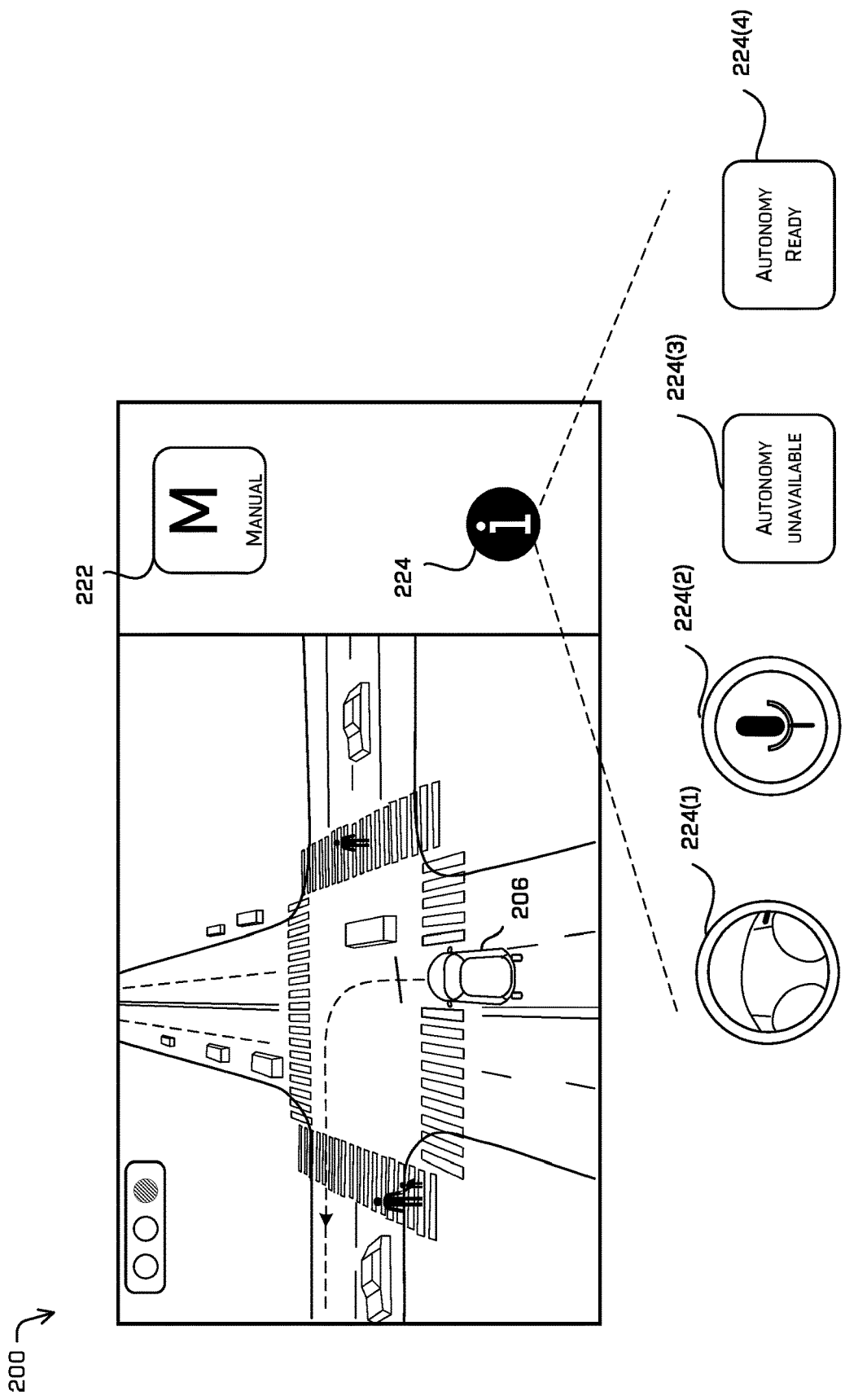
FIG. 2E is an illustration of an example user interface which can be displayed via the display device(s) when a disengagement event occurs in accordance with implementations of this disclosure.

FIG. 2E is an illustration of an example user interface 200 which can be displayed via the display device(s) when a disengagement event occurs in accordance with implementations of this disclosure. In some examples, a vehicle (such as the vehicle 102 described with regard to FIG. 1A) can detect that a disengagement event occurs. As described herein, disengagement may refer to an operator's action of overriding the vehicle. For example, disengagement can occur when the operator grabs the steering wheel, hits the accelerator, hits the brake, unbuckles the seat belt, opens the door, etc. In some examples, when disengagement happens, the vehicle is forced to operate in a manual mode in which the operator is in control of the vehicle. Upon detecting that the disengagement event occurs, the user interface 200 can present a fourth indicator 222 indicating that the vehicle 206 is in a manual mode.

In some examples, the user interface 200 can also present a fifth indicator 224 representing information/status related upon disengagement is detected. For example, the fifth indicator 224 can include various icons, such as a disengagement report requesting icon 224(1), a recording icon 224(2), an autonomy unavailable icon 224(3), and an autonomy ready icon 224(4), or the like. Note that such icons are examples rather than limitations, and other icons can be used as the fifth indicator 224. Additionally or alternatively, the fifth indicator 224 can include windows, boxes, images, texts, audio cues, video cues, or the like.

The various icons can convey requests and/or statuses related to disengagement. For example, the disengagement report requesting icon 224(1) can indicate that a disengagement report is requested. As described herein, the disengagement report can be input by the operator in various ways such as via an audio device, a keyboard, a mouse, a touch pad, a touch screen, a tablet, a camera, or the like. As a non-limiting example, the operator can input the disengagement report in the form of an audio message. For example, the operator can press a button that is convenient to reach (e.g., on the steering wheel, on the dashboard, near the driver's seat, or the like), and start recording the audio message. Then, the operator can press the button again to end the recording. In some examples, the recording icon 224(2) can indicate that recording is going on when the vehicle is recording the audio message.

Additionally, the user interface 200 can present the engagement status of the vehicle 206 to indicate whether the vehicle is ready to be reengaged after disengagement. As described herein, reengagement may refer to an operation where the vehicle is switched from the manual mode back to an autonomy mode. For example, the autonomy unavailable icon 224(3) can indicate that the autonomy of the vehicle 206 is unavailable, and the autonomy ready icon 224(4) can indicate that the autonomy of the vehicle 206 is ready.

Figure 2F:
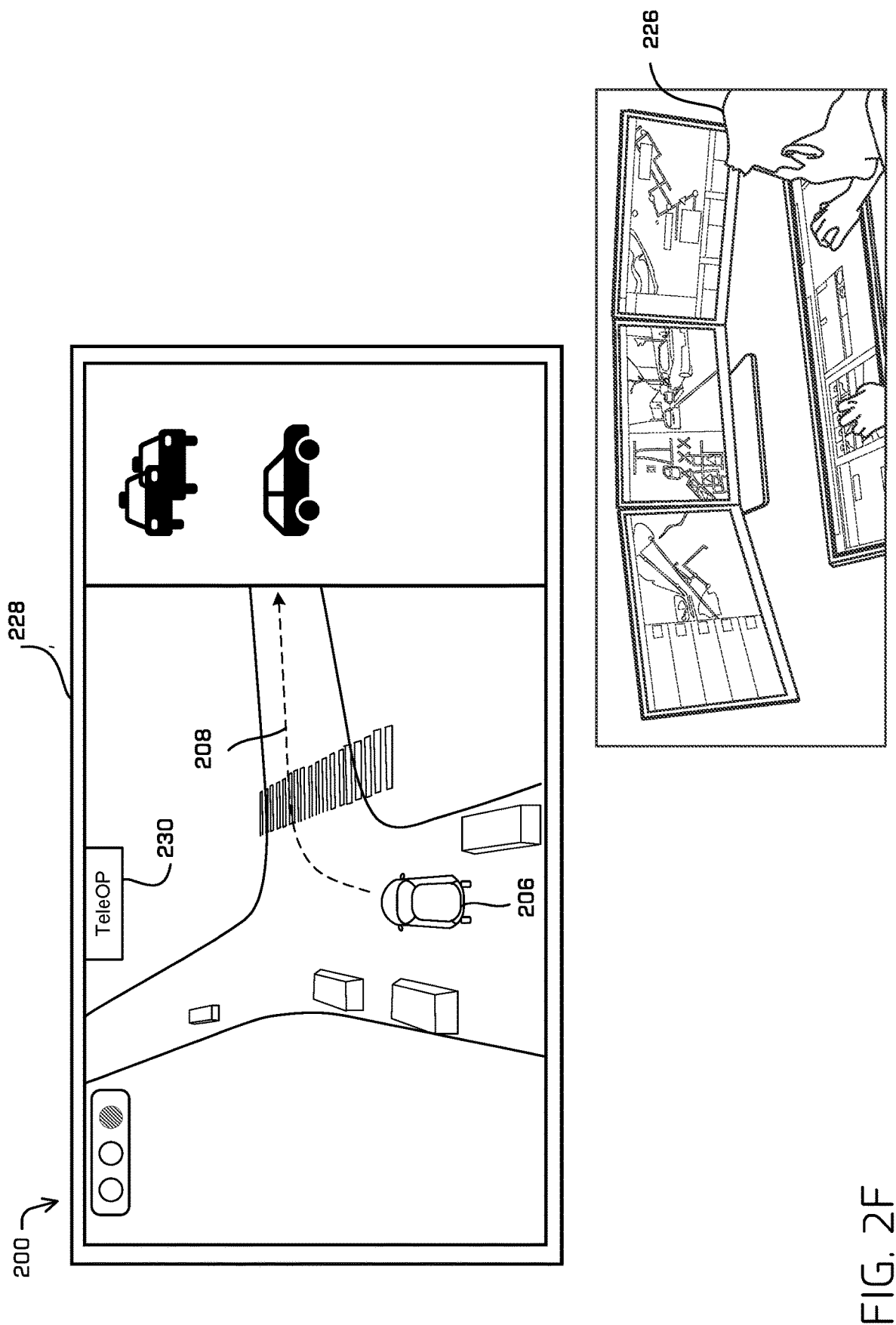
FIG. 2F is an illustration of an example user interface which can be displayed via the display device(s) when remote operation is ongoing in accordance with implementations of this disclosure.

FIG. 2F is an illustration of an example user interface 200 which can be displayed via the display device(s) when remote operation (teleoperation) is ongoing in accordance with implementations of this disclosure. As described above, a vehicle 206 can send a request for teleoperation to remote computing device(s). For example, a teleoperator 226 can access the vehicle computing devices to monitor the behavior of the vehicle 206. In that case, the user interface 200 can present one or more indicators to indicate that the remote operation (teleoperation) is ongoing. For example, the indicators can include an enhanced border 228, and a tab 230 indicating that the remote operation (teleoperation) is ongoing. Note that the enhanced border 228 and the tab 230 are examples rather than limitations, and other forms of indicators can be used, such as graphic icons, semantics icons, windows, boxes, images, texts, audio cues, video cues, or the like. Also, other visual effects can be used to indicate that the remote operation (teleoperation) is ongoing. For example, the color of the vehicle 206 can be changed from a first color (such as blue) to a second color (such as purple) to indicate that the remote operation remote operation (teleoperation) is ongoing. As another example, the color of the trajectory 208 can be changed from a first color (such as blue) to a second color (such as purple) to indicate that the remote operation is ongoing.

In some examples, the user interface 200 can show other indicators and/or messages related to remote operation (teleoperation). For example, when the vehicle 206 requests remote operation (teleoperation) for assistance, the user interface 200 can display an indicator indicating that the vehicle 206 is calling a remote computing device(s) for remote operation (teleoperation). In some examples, the user interface 200 can present a response message sent from the remote computing device(s). In some examples, the response message can include a situational interpretation, a suggestion of disengagement, or a suggestion of one or more maneuvers.

Figure 2G:
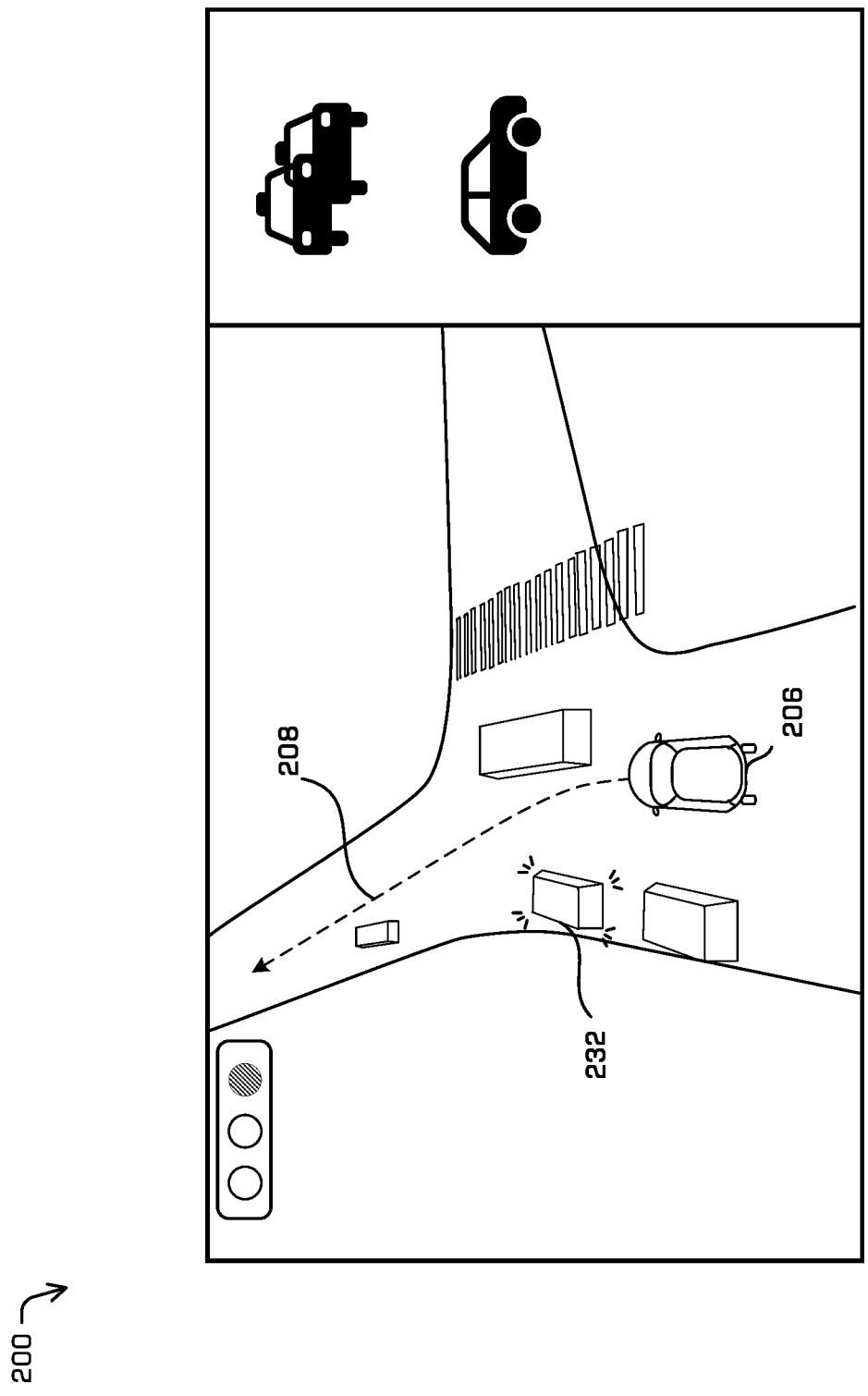
FIG. 2G is an illustration of an example user interface which can be displayed via the display device(s) where an object is displayed with an additional visual effect according to implementations of this disclosure.

FIG. 2G is an illustration of an example user interface 200 which can be displayed via the display device(s) where an object 232 is displayed with an additional visual effect according to implementations of this disclosure. As described herein, a planning component (such as the planning component 116 described with regard to FIG. 1A) can generate planning data which can represent a planned trajectory 208 usable to control the vehicle 206 in the environment and/or metadata associated with the vehicle trajectory 208. In some examples, the planning data of the planning component can include information regarding a classification of detected objects (e.g., a vehicle, a pedestrian, a building, a truck, a motorcycle, a moped, or the like), a state of detected objects (e.g., static, dynamic, or the like), the object characteristics (e.g., maximum speed, acceleration, maneuverability, etc.), or the like. In some instances, the planner component may be uncertain about the classification, state, and/or characteristic of the object. In that case, such an object can be displayed with additional a visual effect such as highlighting, flickering, changing color, or the like. In some examples. For example, in FIG. 2G, the object 232 is shown in a flickering manner, indicating that the planning component is not sure whether it is a parked car or an object blocking the lane. Note that flickering is an example rather than limitations, and other manners (e.g., other visual effects, audio effects, or the like) can be used to indicate an uncertain state of the object.

Note that in the above FIGS. 2A, 2B, 2C, 2D, 2E, 2F, and 2G, the visualization is depicted for illustration purposes rather than limiting this disclosure thereto. Elements like traffic lights, objects (e.g., pedestrians, trucks, cars, or the like), map markers, and trajectories, are depicted as examples. In some examples, fewer or more elements can be included.

Figure 3:
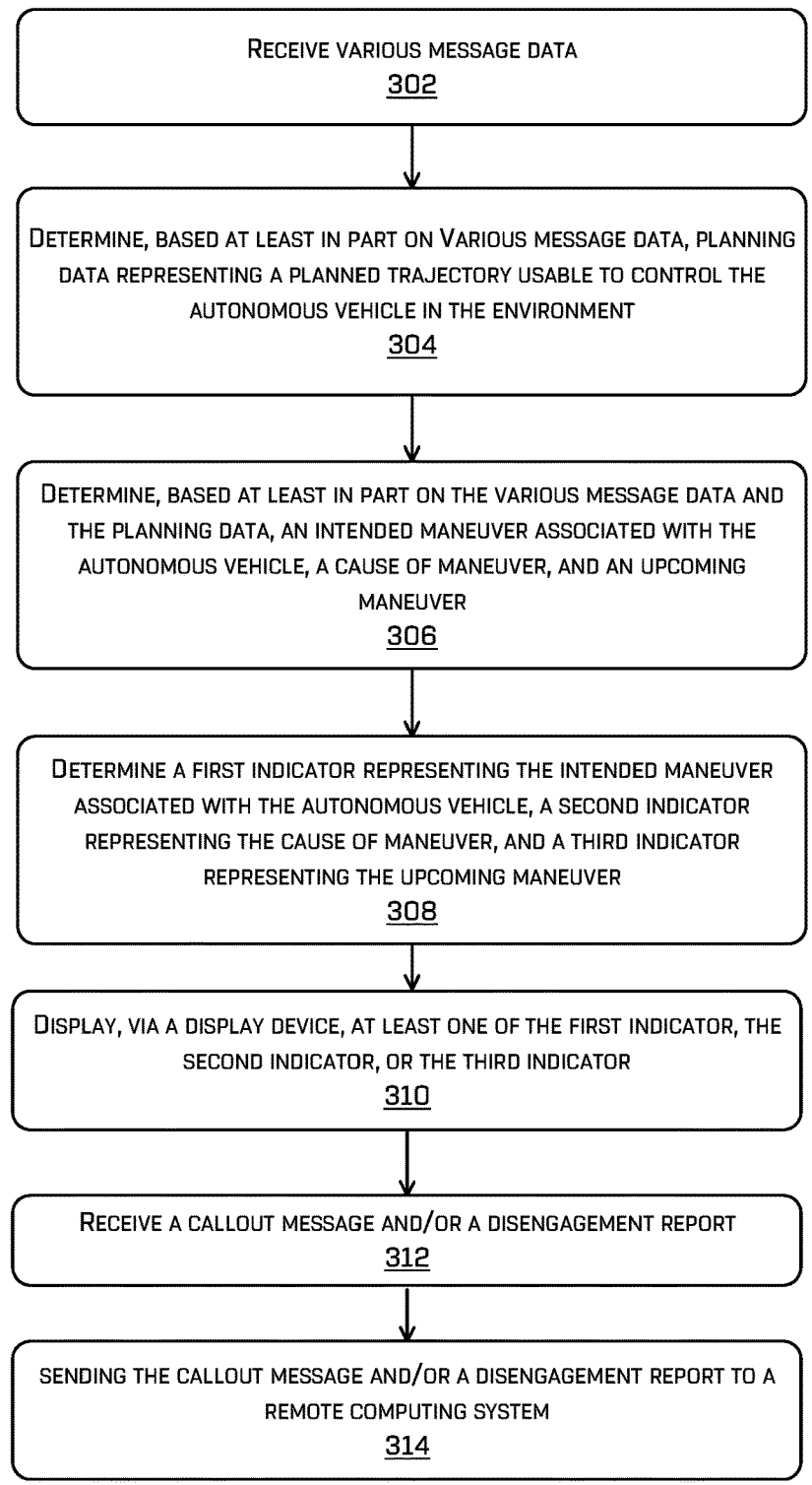
FIG. 3 illustrates an example process for determining situational interpretation information in accordance with examples of the disclosure.

FIG. 3 illustrates an example process 300 for determining situational interpretation information in accordance with examples of the disclosure. The process 300 is illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be omitted and/or combined in any order and/or in parallel to implement the processes.

Figure 4:
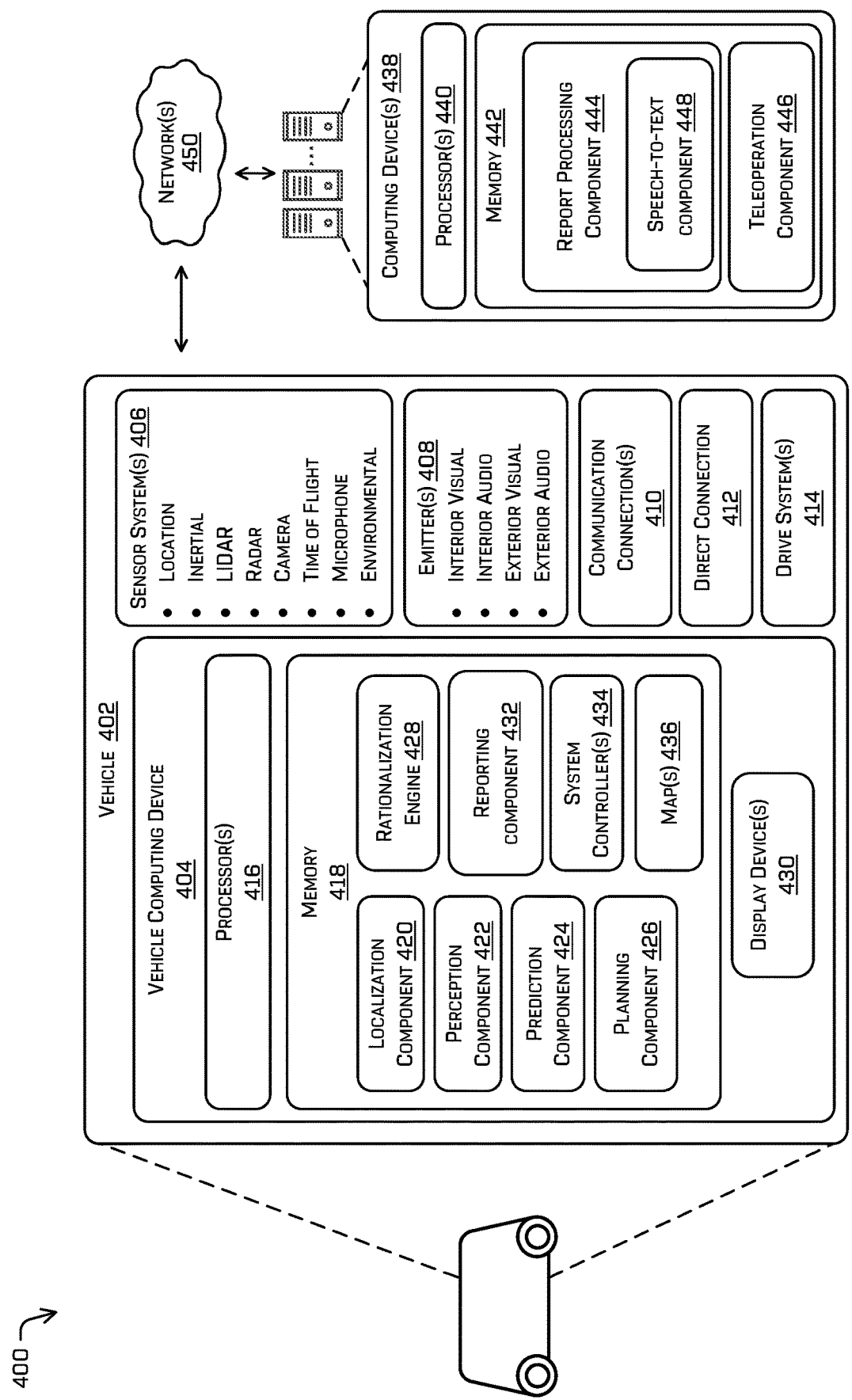
FIG. 4 illustrates a block diagram of an example system for implementing the techniques described herein.

For example, some or all of the process 300 can be performed by one or more components in FIGS. 1 and 4, as described herein. For example, some or all of the process 300 can be performed by the vehicle computing device 106, the vehicle computing device 404, the computing device(s) 108, or the computing device 438. However, the process 300 is not limited to being performed by these components, and the components are not limited to performing the process 300.

At operation 302, the process 300 can include receiving various message data (such as the sensor data associated with an autonomous vehicle traversing an environment, perception data, control data, map data associated with the environment, additional data, or the like). As described herein, the autonomous vehicle can include a sensor system (including a variety of sensors such as location sensors, inertial sensors, LIDAR sensors, RADAR sensors, cameras, environment sensors, time of flight, or the like) capable of capturing the sensor data as the autonomous vehicle traverses the environment. In some examples, the map data can be stored in the autonomous vehicle or can be received from a database. In some examples, the additional data can include weather data (e.g., data regarding temperature, humidity, wind speed, rain or snow, sunny or cloudy, or the like), traffic data (e.g., data regarding traffic flow, traffic speed, traffic congestion, or the like), road construction data (e.g., data regarding the ongoing road construction, or the like), regulation data (e.g., data regarding speed limit, parking regulations, or the like), data provided by a third-party such as law enforcement agency, a department of motor vehicle, and/or a safety administration that can publish and/or store reports of activities and/or incidents, and the like.

At operation 304, the process 300 can include determining, based at least in part on the various message data (such as the sensor data, the perception data, the control data, the map data, the additional data, or the like), planning data representing a planned trajectory usable to control the autonomous vehicle in the environment. In various examples, the perception data can include information regarding a classification of detected objects (e.g., determine an object type), for example, whether the object is a vehicle, a pedestrian, a building, a truck, a motorcycle, a moped, or the like. In various examples, the perception data can include information regarding a vehicle state, an object state, and/or a control policy, environmental features based on the map data, and/or safety thresholds (e.g., a safety range) for a speed, an acceleration, a steering, and/or a braking action.

In some examples, the perception data can include metadata. In various examples, the metadata can indicate an action or behavior by the vehicle (e.g., "continue to follow vehicle", "stay in lane", etc.) along the trajectory. In some examples, the planning data provided by the planning component can include metadata, usable to interpret why the planning component determines the trajectory to control the vehicle in the environment. In some examples, the metadata can represent an intent of the vehicle and/or characteristics of the environment (e.g., what the vehicle is doing relative to the trajectories). In some examples, the metadata can be associated with one or more regions of a map. In some examples, the metadata can also be associated with weather, intersection information, and/or object behavior (e.g., erratic or aggressive objects). In various examples, the metadata can include time information (e.g., a time or time period) such that the vehicle behavior, the object behavior, and/or the trajectories are associated with time. For instance, the planning component can associate the planned trajectory with the metadata based on the time information.

At operation 306, the process 300 can include determining, based at least in part on the various message data and the planning data, an intended maneuver associated with the autonomous vehicle, a cause of maneuver, and an upcoming maneuver. In some examples, the planning component can send the planning data to a rationalization engine, which can be configured to determine situational interpretation information based on the various message data and the planning data. For instance, the situational interpretation information can include the intended maneuver associated with the vehicle, the cause of maneuver, the upcoming maneuver associated with the vehicle, or the like.

At operation 308, the process 300 can include determining a first indicator representing the intended maneuver associated with the autonomous vehicle, a second indicator representing the cause of maneuver, and a third indicator representing the upcoming maneuver. In some examples, the indicators can include icons, windows, boxes, images, texts, audio cues, video cues, etc.

At operation 310, the process 300 can include displaying, via a display device, at least one of the first indicator, the second indicator, or the third indicator. In some examples, the display device can display a visualization along with the indicators. For example, the visualization can present images of another vehicle, pedestrian, etc. sensed in the vicinity of the vehicle to give the operator an overview of current and future vehicle operations, causes for the vehicle to take a current action relative to one or more objects, or the like. In some examples, the visualization can display an object with additional visual effects (or audio effects) to indicate that the planning component is not certain about the state and/or characteristic of the object. For example, the visualization can present a truck in a flickering manner as the vehicle passes the truck, indicating that the planning component is not certain about the state and/or characteristics of the truck.

At operation 312, the process 300 can include receiving a callout message. In some examples, the callout message can indicate a situation associated with the autonomous vehicle. For example, the callout message can indicate an event associated with the vehicle, such as an error in processed data (e.g., a missed detection), a discrepancy (e.g., wrong object classification, difference in position and/or orientation, wrong speed limit, not localized in a lane correctly, etc.), or any other divergence from expect behavior of the system.

In some examples, under various circumstances, the disengagement event may occur, and the vehicle can be switched to a manual mode. For example, the disengagement event may occur, when the vehicle makes an illegal left turn, when the maneuver of the vehicle does not match an expectation of the operator, when the operator feels uncomfortable, or the like. In some examples, the autonomous vehicle can determine that a disengagement event occurs. Upon determining that the disengagement event occurs, the vehicle can determine an indicator indicating that the autonomous vehicle is in a manual mode, and an indicator requesting a disengagement report. The vehicle can display such indicators via the display device. In some examples, the vehicle can receive an audio message, and can record the audio message to be at least a part of the disengagement report.

In some examples, the vehicle can send a teleoperation request to a remote computing system. For example, a teleoperator who is a remote assistant can perform the remote operation (teleoperation) in response to the teleoperation request. In various examples, the teleoperator may not drive the autonomous vehicle, but can help to interpret a situation when the vehicle is misunderstanding the situation. For example, the autonomous vehicle may be stuck behind a vehicle, which is parked, but the autonomous vehicle takes the car as a driving car and tries to follow the car. In such a case the autonomous vehicle can send a teleoperation request to a remote computing system. the autonomous vehicle can display, via the display device, an indicator indicating that the autonomous vehicle is calling the remote computing system. Upon determining that the remote computing system is monitoring the autonomous vehicle, the autonomous vehicle can display, via the display device, an indicator indicating that the remote computing system is monitoring the autonomous vehicle. For example, the operator can understand that the teleoperator is working on the situation, and can wait for a period of time before taking action (such as disengagement). In some examples, the teleoperator can interpret the situation and return a response message. In some examples, if the teleoperator cannot interpret the situation, the teleoperator can return a suggestion of disengagement. In some examples, the teleoperator can return a suggestion of one or more maneuvers. For example, the teleoperator may figure out that there is an obstruction in the road and can return a suggestion that the operator makes one or more maneuvers (e.g., shift into reverse, shift into drive, or the like) to get around the obstruction. The vehicle can display the response message and/or suggestions via the display device.

At operation 314, the process 300 can include sending the callout message and or the disengagement report to a remote computing system. As described above, the operator can provide information about the actions of the vehicle such as a callout message describing operation of the autonomous system (e.g., missed detections, incorrect determinations, wrong action taken, etc.). Moreover, in some examples, disengagement may occur in which the autonomous vehicle may switch to a manual mode. The callout messages and the disengagement reports can be received, recorded, and transmitted to the remote computing system for downstream analysis.

In some examples, the autonomous vehicle can record an audio callout message from the operator in the autonomous vehicle. The autonomous vehicle can associate, as a report, one or more of at least a portion of the sensor data, the planned trajectory, the object, or the intended maneuver with the audio callout message. The remote computing system can receive and process the callout message. For example, the remote computing system can convert the audio callout message into a text messaged using one or more of speech-to-text or natural language processing.

In some examples, the remote computing system can categorize the disengagement event based at least in part on the disengagement report. In some examples, the disengagement report can be associated with one or more labels (such as a hashtag or the like). In some examples, the remote computing system can transcribe the audio message to generate a transcribed text.

In some examples, the remote computing system can present the callout messages and/or the disengagement report via an application programming interface (API). As such, a user such as a software engineer can improve the software for controlling the autonomous vehicle based on the callout messages and/or the disengagement reports. For example, the user can query the disengagement data based on the labels to retrieve all the disengagement reports classified as "follow on lead." In some such examples, data (e.g., sensor data, perception data, planner data, control data, vehicle system or subsystem status data, localization data, etc.) may be queried from a database having timestamps associated with the queried callout such that a software developer may apprehend the cause of the error or otherwise develop software to resolve the issue.

The methods described herein represent sequences of operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes. In some embodiments, one or more operations of the method may be omitted entirely. Moreover, the methods described herein can be combined in whole or in part with each other or with other methods.

FIG. 4 illustrates a block diagram of an example system 400 for implementing the techniques described herein. In at least one example, the system 400 can include a vehicle 402, which can be the same vehicle as the vehicle 102 described above with reference to FIG. 1A.

The vehicle 402 may include a vehicle computing device 404 (e.g., one or more devices), one or more sensor systems 406, one or more emitters 408, one or more communication connections 410, at least one direct connection 412, and one or more drive system(s) 414.

The vehicle computing device 404 may include one or more processors 416 and memory 418 communicatively coupled with the one or more processors 416. In the illustrated example, the vehicle 402 can be an autonomous vehicle, a semi-autonomous vehicle, or any other system having at least an image capture device (e.g., a camera enabled smartphone). In some instances, the autonomous vehicle 402 may be an autonomous vehicle configured to operate according to a Level 3 classification issued by the U.S. National Highway Traffic Safety Administration, which describes a vehicle capable of performing all safety-critical functions for the entire trip, with the driver (or occupant) not being expected to control the vehicle at any time. However, in other examples, the autonomous vehicle 402 may be a fully or partially autonomous vehicle having any other level or classification.

In the illustrated example, the memory 418 of the vehicle computing device 404 stores a localization component 420, a perception component 422, a prediction component 424, a planning component 426, a rationalization engine 428, one or more device(s), a disengagement reporting component, one or more system controllers 434, and one or more maps 436. Though depicted in FIG. 4 as residing in the memory 418 for illustrative purposes, it is contemplated that the localization component 420, the perception component 422, the prediction component 424, the planning component 426, the rationalization engine 428, the reporting component 432, one or more system controllers 434, and one or more maps 436 may additionally, or alternatively, be accessible to the vehicle 402 (e.g., stored on, or otherwise accessible by, memory remote from the vehicle 402, such as, for example, on memory 442 of a remote computing device 438).

In at least one example, the localization component 420 may receive data from the sensor system(s) 406 to determine a position and/or orientation of the vehicle 402 (e.g., one or more of an x-, y-, z-position, roll, pitch, or yaw). For example, the localization component 420 may include and/or request/receive a map of an environment, such as from map(s) 436 and/or map component 446, and may continuously determine a location and/or orientation of the autonomous vehicle within the map. In some instances, the localization component 420 may utilize SLAM (simultaneous localization and mapping), CLAMS (calibration, localization, and mapping, simultaneously), relative SLAM, bundle adjustment, non-linear least squares optimization, or the like to receive image data, LIDAR data, RADAR data, IMU data, GPS data, wheel encoder data, and the like to accurately determine a location of the autonomous vehicle. In some instances, the localization component 420 may provide data to various components of the vehicle 402 to determine an initial position of an autonomous vehicle for determining the relevance of an object to the vehicle 402, as discussed herein.

In some instances, the perception component 422 may perform object detection, segmentation, and/or classification. In some examples, the perception component 422 may provide processed sensor data that indicates a presence of an object (e.g., entity) that is proximate to the vehicle 402 and/or a classification of the object as an object type (e.g., car, pedestrian, cyclist, animal, building, tree, road surface, curb, sidewalk, unknown, etc.). In some examples, the perception component 422 may provide processed sensor data that indicates a presence of a stationary entity that is proximate to the vehicle 402 and/or a classification of the stationary entity as a type (e.g., building, tree, road surface, curb, sidewalk, unknown, etc.). In additional or alternative examples, the perception component 422 may provide processed sensor data that indicates one or more features associated with a detected object (e.g., a tracked object) and/or the environment in which the object is positioned. In implementations, the perception component 422 can specifically identify articulated objects, such as articulated vehicles. In some examples, features associated with an object may include, but are not limited to, an x-position (global and/or local position), a y-position (global and/or local position), a z-position (global and/or local position), an orientation (e.g., a roll, pitch, yaw), an object type (e.g., a classification), a velocity of the object, an acceleration of the object, an extent of the object (size), etc. Features associated with the environment may include, but are not limited to, a presence of another object in the environment, a state of another object in the environment, a time of day, a day of a week, a season, a weather condition, an indication of darkness/light, etc.

The prediction component 424 can generate one or more probability maps representing prediction probabilities of possible locations of one or more objects in an environment. For example, the prediction component 424 can generate one or more probability maps for articulated objects, vehicles, pedestrians, animals, and the like within a threshold distance from the vehicle 402. In some instances, the prediction component 424 can measure a track of an object and generate a discretized prediction probability map, a heat map, a probability distribution, a discretized probability distribution, and/or a trajectory for the object based on observed and predicted behavior. In some instances, the one or more probability maps can represent an intent of the one or more objects in the environment.

In some examples, the prediction component 424 may generate predicted trajectories of objects (e.g., articulated objects) in an environment and/or generate predicted candidate trajectories for the vehicle 402. For example, the prediction component 424 may generate one or more predicted trajectories for objects within a threshold distance from the vehicle 402. In some examples, the prediction component 424 may measure a trace of an object and generate a trajectory for the object based on observed and predicted behavior.

In general, the planning component 426 may determine a trajectory for the vehicle 402 to follow to traverse through an environment. For example, the planning component 426 may determine various routes and trajectories and various levels of detail. For example, the planning component 426 may determine a route to travel from a first location (e.g., a current location) to a second location (e.g., a target location). For the purpose of this discussion, a route may include a sequence of waypoints for traveling between two locations. As non-limiting examples, waypoints include streets, intersections, global positioning system (GPS) coordinates, etc. Further, the planning component 426 may generate an instruction for guiding the autonomous vehicle along at least a portion of the route from the first location to the second location. In at least one example, the planning component 426 may determine how to guide the autonomous vehicle from a first waypoint in the sequence of waypoints to a second waypoint in the sequence of waypoints. In some examples, the instruction may be a candidate trajectory, or a portion of a trajectory. In some examples, multiple trajectories may be substantially simultaneously generated (e.g., within technical tolerances) in accordance with a receding horizon technique.

In other examples, the planning component 426 can process the sensor data associated with the vehicle 402 captured by the sensor system 406, the map data associated with the environment, and/or additional data, to determine planning data. In some examples, the planning data of the planning component 116 can include trajectory data representing a planned trajectory usable to control the vehicle 102 in the environment 100 and metadata.

In some examples, the metadata can represent actions or maneuvers to be performed by the vehicle 102 (e.g., "continue to follow vehicle", "stay in lane", etc.) along the trajectory. In some examples, the metadata can include information usable to interpret why the planning component 116 determines the trajectory to control the vehicle 102 in the environment 100. In some examples, the metadata can represent an intent of the vehicle 102 and/or characteristics of the environment. In some examples, the metadata can be associated with one or more regions of a map. In some examples, the metadata can also be associated with weather, intersection information, and/or object behavior (e.g., erratic or aggressive objects). In various examples, the metadata can include time information (e.g., a time or time period) such that the vehicle behavior, the object behavior, and/or the trajectories are associated with time. For instance, the planning component 116 can associate the planned trajectory with the metadata based on the time information.

The rationalization engine 428 can receive various message data (such as the sensor data, the perception data, the control data, the map data, the additional data, or the like) and the planning data. The rationalization engine 428 can semantically decode information included in the various message data and the planning data and determine situational interpretation information based on the various message data and the planning data. For instance, the situational interpretation information can include the intended maneuver associated with the vehicle 402, the cause of maneuver, the upcoming maneuver associated with the vehicle 402, or the like.

In some examples, the rationalization engine 428 can determine the intended maneuver associated with the vehicle 402 and the cause of maneuver based on the various message data and the planning data received from multiple systems and/or subsystems. As described above, the planning data can include trajectory data representing a planned trajectory and associated metadata. In some examples, the planned trajectory can include subgoals. Additionally or alternatively, the planned trajectory can be generated by the planning component based on tree search techniques.

In some examples, the rationalization engine 428 can determine one or more indicators, interpreting the situation associated with the vehicle 402. For example, the indicators can include, but are not limited to, an indicator indicating an intended maneuver of the vehicle 402, an indicator indicating a cause of maneuver, an indicator indicating an upcoming maneuver of the vehicle 402, an indicator indicating a mode of the vehicle 402, an indicator indicating whether autonomy is ready to be engaged, an indicator indicating that recording is going on, an indicator indicating that remote operation (teleoperation) is going on, or the like. In some examples, the indicators can include icons, windows, boxes, images, texts, audio cues, video cues, etc.

The vehicle computing device 404 can include one or more display devices 430 which can include but are not limited to, liquid crystal display (LCD), touch screen, flat panel display, light emitting diode (LED) monitor, or the like. In some examples, the display device can display the one or more indicators determined by the rationalization engine 428. In some examples, the display device(s) 430 can display a visualization along with the indicators. For example, the visualization can present images of another vehicle, pedestrian, etc. sensed in the vicinity of the vehicle to give the operator an overview of current and future vehicle operations, causes for the vehicle to take a current action relative to one or more objects, or the like. In some examples, the visualization can display an object with additional visual effects (or audio effects) to indicate that the planning component 426 is not certain about the state and/or characteristic of the object. For example, the visualization can present a truck in a flickering manner as the vehicle 102 passes the truck, indicating that the planning component is not certain about the state and/or characteristic of the truck.

The reporting component 432 can receive a callout report and/or a disengagement report. In some examples, the callout report and/or the disengagement report can be input by the operator in various ways such as via an audio device, a keyboard, a mouse, a touch pad, a touch screen, a tablet, a camera, or the like. In some examples, callout report and/or the disengagement report can include audio messages, text messages, gesture messages, or the like. As a non-limiting example, the operator can press a button to start/end the recording of an audio message, and speak to the microphone of the sensor system(s) 406. The audio message can be included as at least a part of the callout report and/or the disengagement report. The reporting component 432 can receive and record the audio message to be at least a part of the callout report and/or the disengagement report. In some examples, the callout report and/or the disengagement report can be stored in the form of an audio file, a text file, an image file, a video file, a combination thereof, and so on.

In at least one example, the vehicle computing device 404 may include one or more system controllers 434, which may be configured to control steering, propulsion, braking, safety, emitters, communication, and other systems of the vehicle 402. The system controller(s) 434 may communicate with and/or control corresponding systems of the drive system(s) 414 and/or other components of the vehicle 402.

The memory 418 may further include one or more maps 436 that may be used by the vehicle 402 to navigate within the environment. For the purpose of this discussion, a map may be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map may include, but is not limited to: texture information (e.g., color information (e.g., RGB color information, Lab color information, HSV/HSL color information), and the like), intensity information (e.g., LIDAR information, RADAR information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map may include a three-dimensional mesh of the environment. In some examples, the vehicle 402 may be controlled based at least in part on the map(s) 436. That is, the map(s) 436 may be used in connection with the localization component 420, the perception component 422, the prediction component 424, and/or the planning component 426 to determine a location of the vehicle 402, detect objects in an environment, generate routes, determine actions and/or trajectories to navigate within an environment.

In some examples, the one or more maps 436 may be stored on a remote computing device(s) (such as the computing device(s) 438) accessible via network(s) 450. In some examples, multiple maps 436 may be stored based on, for example, a characteristic (e.g., type of entity, time of day, day of week, season of the year, etc.). Storing multiple maps 436 may have similar memory requirements, but increase the speed at which data in a map may be accessed.

As can be understood, the components discussed herein (e.g., the localization component 420, the perception component 422, the prediction component 424, the planning component 426, the one or more system controllers 434, the one or more maps 436, are described as divided for illustrative purposes. However, the operations performed by the various components may be combined or performed in any other component.

In some instances, aspects of some or all of the components discussed herein may include any models, techniques, and/or machine learned techniques. For example, in some instances, the components in the memory 418 (and the memory 442, discussed below) may be implemented as a neural network.

As described herein, an exemplary neural network is a technique which passes input data through a series of connected layers to produce an output. Each layer in a neural network may also comprise another neural network, or may comprise any number of layers (whether convolutional or not). As can be understood in the context of this disclosure, a neural network may utilize machine learning, which may refer to a broad class of such techniques in which an output is generated based on learned parameters.

Although discussed in the context of neural networks, any type of machine learning may be used consistent with this disclosure. For example, machine learning techniques may include, but are not limited to, regression techniques (e.g., ordinary least squares regression (OLSR), linear regression, logistic regression, stepwise regression, multivariate adaptive regression splines (MARS), locally estimated scatterplot smoothing (LOESS)), instance-based techniques (e.g., ridge regression, least absolute shrinkage and selection operator (LASSO), elastic net, least-angle regression (LARS)), decisions tree techniques (e.g., classification and regression tree (CART), iterative dichotomiser 3 (ID3), Chi-squared automatic interaction detection (CHAID), decision stump, conditional decision trees), Bayesian techniques (e.g., naïve Bayes, Gaussian naïve Bayes, multinomial naïve Bayes, average one-dependence estimators (AODE), Bayesian belief network (BNN), Bayesian networks), clustering techniques (e.g., k-means, k-medians, expectation maximization (EM), hierarchical clustering), association rule learning techniques (e.g., perceptron, back-propagation, hopfield network, Radial Basis Function Network (RBFN)), deep learning techniques (e.g., Deep Boltzmann Machine (DBM), Deep Belief Networks (DBN), Convolutional Neural Network (CNN), Stacked Auto-Encoders), Dimensionality Reduction Techniques (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Techniques (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 406 may include LIDAR sensors, RADAR sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 406 may include multiple instances of each of these or other types of sensors. For instance, the LIDAR sensors may include individual LIDAR sensors located at the corners, front, back, sides, and/or top of the vehicle 402. As another example, the camera sensors may include multiple cameras disposed at various locations about the exterior and/or interior of the vehicle 402. The sensor system(s) 406 may provide input to the vehicle computing device 404. Additionally, or in the alternative, the sensor system(s) 406 may send sensor data, via the one or more networks 450, to the one or more computing device(s) 438 at a particular frequency, after a lapse of a predetermined period of time, in near real-time, etc.

The vehicle 402 may also include one or more emitters 408 for emitting light and/or sound. The emitter(s) 408 may include interior audio and visual emitters to communicate with passengers of the vehicle 402. By way of example and not limitation, interior emitters may include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 408 may also include exterior emitters. By way of example and not limitation, the exterior emitters may include lights to signal a direction of travel or other indicator of vehicle action (e.g., indicator lights, signs, light arrays, etc.), and one or more audio emitters (e.g., speakers, speaker arrays, homes, etc.) to audibly communicate with pedestrians or other nearby vehicles, one or more of which comprising acoustic beam steering technology.

The vehicle 402 may also include one or more communication connections 410 that enable communication between the vehicle 402 and one or more other local or remote computing device(s). For instance, the communication connection(s) 410 may facilitate communication with other local computing device(s) on the vehicle 402 and/or the drive system(s) 414. Also, the communication connection(s) 410 may allow the vehicle to communicate with other nearby computing device(s) (e.g., remote computing device 438, other nearby vehicles, etc.) and/or one or more remote sensor system(s) for receiving sensor data. The communications connection(s) 410 also enable the vehicle 402 to communicate with a remote teleoperations computing device or other remote services.

The communications connection(s) 410 may include physical and/or logical interfaces for connecting the vehicle computing device 404 to another computing device or a network, such as network(s) 450. For example, the communications connection(s) 410 can enable Wi-Fi-based communication such as via frequencies defined by the IEEE 802.11 standards, short range wireless frequencies such as Bluetooth, cellular communication (e.g., 2G, 3G, 4G, 4G LTE, 5G, etc.) or any suitable wired or wireless communications protocol that enables the respective computing device to interface with the other computing device(s).

In at least one example, the vehicle 402 may include one or more drive systems 414. In some examples, the vehicle 402 may have a single drive system 414. In at least one example, if the vehicle 402 has multiple drive systems 414, individual drive systems 414 may be positioned on opposite ends of the vehicle 402 (e.g., the front and the rear, etc.). In at least one example, the drive system(s) 414 may include one or more sensor systems to detect conditions of the drive system(s) 414 and/or the surroundings of the vehicle 402. By way of example and not limitation, the sensor system(s) may include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect objects in the surroundings of the drive module, LIDAR sensors, RADAR sensors, etc. Some sensors, such as the wheel encoders may be unique to the drive system(s) 414. In some cases, the sensor system(s) on the drive system(s) 414 may overlap or supplement corresponding systems of the vehicle 402 (e.g., sensor system(s) 406).

The drive system(s) 414 may include many of the vehicle systems, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 414 may include a drive module controller which may receive and preprocess data from the sensor system(s) and to control operation of the various vehicle systems. In some examples, the drive module controller may include one or more processors and memory communicatively coupled with the one or more processors. The memory may store one or more modules to perform various functionalities of the drive system(s) 414. Furthermore, the drive system(s) 414 may also include one or more communication connection(s) that enable communication by the respective drive module with one or more other local or remote computing device(s).

In at least one example, the direct connection 412 may provide a physical interface to couple the one or more drive system(s) 414 with the body of the vehicle 402. For example, the direct connection 412 may allow the transfer of energy, fluids, air, data, etc. between the drive system(s) 414 and the vehicle. In some instances, the direct connection 412 may further releasably secure the drive system(s) 414 to the body of the vehicle 402.

In at least one example, the localization component 420, the perception component 422, the prediction component 424, the planning component 426, the rationalization engine 428, the reporting component 432, the one or more system controllers 434, the one or more maps 436, may process sensor data, as described above, and may send their respective outputs, over the one or more network(s) 450, to the computing device(s) 438. In at least one example, the localization component 420, the perception component 422, the prediction component 424, the planning component 426, the rationalization engine 428, the reporting component 432, the one or more system controllers 434, the one or more maps 436 at a particular frequency, after a lapse of a predetermined period of time, in near real-time, etc.

In some examples, the vehicle 402 may send sensor data to the computing device(s) 438 via the network(s) 450. In some examples, the vehicle 402 may receive sensor data from the computing device(s) 438 and/or remote sensor system(s) via the network(s) 450. The sensor data may include raw sensor data and/or processed sensor data and/or representations of sensor data. In some examples, the sensor data (raw or processed) may be sent and/or received as one or more log files.

The computing device(s) 438 may include processor(s) 440 and a memory 442 storing a report processing component 444 and a teleoperation component 446. In some examples, the report processing component 444 can be configured to process the callout report and/or the disengagement report sent from the vehicle computing device(s) 404. In some examples, the report processing component 128 can include a speech-to-text component 448 configured to transcribe a speech into a text. For example, the callout report and/or the disengagement report can include an audio message, and the speech-to-text component 130 can transcribe the audio message into a transcribed message (such as a text message). In some examples, the callout report and/or the disengagement report can be presented via an application programming interface (API). In some examples, the report processing component 444 can categorize the disengagement event based on the information included in the disengagement report. In some examples, a user such as an engineer can view the callout report and/or the disengagement report via the API, and improve the controlling program of the autonomous vehicle 402.

In some examples, the vehicle computing device(s) 404 can send a request for remote operation (teleoperation) to the computing device(s) 438. In some instances, remote operation (teleoperation) may refer to the operation on a machine performed by another machine at distance. In response, the teleoperation component 446 can be access the vehicle computing device(s) 404 remotely to perform remote operation (teleoperation). For example, a teleoperator can monitor the information displayed via the display device(s) 124 on the vehicle computing device(s) 404.

The teleoperation component 446 can send a response message to the vehicle computing device(s) 404. In some examples, the response message can include a situational interpretation, a suggestion of disengagement, or a suggestion of one or more maneuvers. In some instances, the teleoperation component 446 can send a response message to the vehicle computing device(s) 106 to interpret the situation. In some instances, the teleoperator may figure out that there is a failure of the vehicle 402 and the teleoperation component 446 can send a suggestion for the operator to disengage the vehicle 402. In some instances, the teleoperator may figure out that there is an obstruction in the road and the teleoperation component 446 can send a suggestion that the operator make one or more maneuvers (e.g., shift into reverse, shift into drive, or the like) to get around of the obstruction.

The processor(s) 416 of the vehicle 402 and the processor(s) 440 of the computing device(s) 438 may be any suitable processor capable of executing instructions to process data and perform operations as described herein. By way of example and not limitation, the processor(s) 416 and 440 may comprise one or more Central Processing Units (CPUs), Graphics Processing Units (GPUs), or any other device or portion of a device that processes electronic data to transform that electronic data into other electronic data that may be stored in registers and/or memory. In some examples, integrated circuits (e.g., ASICs, etc.), gate arrays (e.g., FPGAs, etc.), and other hardware devices may also be considered processors in so far as they are configured to implement encoded instructions.

Memory 418 and memory 442 are examples of non-transitory computer-readable media. The memory 418 and memory 442 may store an operating system and one or more software applications, instructions, programs, and/or data to implement the methods described herein and the functions attributed to the various systems. In various implementations, the memory may be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein may include many other logical, programmatic, and physical components, of which those shown in the accompanying figures are merely examples that are related to the discussion herein.

It should be noted that while FIG. 4 is illustrated as a distributed system, in alternative examples, components of the vehicle 402 may be associated with the computing device(s) 438 and/or components of the computing device(s) 438 may be associated with the vehicle 402. That is, the vehicle 402 may perform one or more of the functions associated with the computing device(s) 438, and vice versa.

The various techniques described herein may be implemented in the context of computer-executable instructions or software, such as program modules, that are stored in computer-readable storage and executed by the processor(s) of one or more computing devices such as those illustrated in the figures. Generally, program modules include routines, programs, objects, components, data structures, etc., and define operating logic for performing particular tasks or implement particular abstract data types.

Other architectures may be used to implement the described functionality and are intended to be within the scope of this disclosure. Furthermore, although specific distributions of responsibilities are defined above for purposes of discussion, the various functions and responsibilities might be distributed and divided in different ways, depending on circumstances.

Similarly, software may be stored and distributed in various ways and using different means, and the particular software storage and execution configurations described above may be varied in many different ways. Thus, software implementing the techniques described above may be distributed on various types of computer-readable media, not limited to the forms of memory that are specifically described.

EXAMPLE CLAUSES

Any of the example clauses in this section may be used with any other of the example clauses and/or any of the other examples or embodiments described herein.

A: A system comprising: one or more processors; and one or more non-transitory computer-readable media storing instructions executable by the one or more processors, wherein the instructions, when executed, cause the system to perform operations comprising: receiving sensor data associated with an autonomous vehicle traversing an environment; determining, based at least in part on the sensor data, an object proximate the vehicle; determining, based at least in part on the object, a planned trajectory for the autonomous vehicle, the planned trajectory associated with an intended maneuver; determining a first indicator representative of the intended maneuver; determining a second indicator representative of the object; determining, based at least in part on the planned trajectory, an upcoming maneuver associated with the autonomous vehicle, the upcoming maneuver comprising a maneuver to be executed at a future time, after completion of the intended maneuver; determining a third indicator representative of the upcoming maneuver; and displaying, via a display device in the autonomous vehicle, the first indicator, the second indicator, and the third indicator.

B: The system of paragraph A, further comprising: recording, in the autonomous vehicle, an audio message; and associating, as a report, one or more of at least a portion of the sensor data, the planned trajectory, the object, or the intended maneuver with the audio message.

C: The system of paragraph B, further comprising: determining, as a note, one or more of speech-to-text or natural language processing on the audio message, wherein the report is further associated with the note.

D: The system of any one of paragraphs A-C, further comprising: receiving a command from an operator to control the autonomous vehicle; determining a fourth indicator indicating that the autonomous vehicle is in a manual mode and a fifth indicator requesting a disengagement report; and displaying, via the display device, the fourth indicator and the fifth indicator.

E: The system of any one of paragraphs A-D, the operations further comprising displaying, together with the first indicator, the second indicator, and the third indicator, a visualization of the environment in which the autonomous vehicle traverses, the visualization presenting at least one of a traffic signal, one or more objects, one or more map markers, or the autonomous vehicle.

F: A method comprising: receiving sensor data associated with an autonomous vehicle traversing an environment; determining, based at least in part on the sensor data, a planned trajectory usable to control the autonomous vehicle in the environment; determining, based at least in part on the planned trajectory, situational information associated with the planned trajectory; determining one or more indicators representing the situational information associated with the autonomous vehicle; and displaying, via a display device in the autonomous vehicle, the one or more indicators.

G: The method of paragraph F, wherein determining the one or more indicators comprises: determining an indicator representing an intended maneuver associated with the autonomous vehicle based on the planned trajectory.

H: The method of paragraph G, wherein the first indicator comprises at least one of a proceed icon indicating that the autonomous vehicle is proceeding; a double parked vehicle (DPV) icon indicating that the autonomous vehicle is handling a DPV; a lane blocked icon indicating that the autonomous vehicle is handling a blocked lane; a missing data icon indicating that the intended maneuver of the autonomous vehicle cannot be determined; a stopping icon indicating that the autonomous vehicle is stopping; a caution icon indicating that the autonomous vehicle is taking caution; a yield icon indicating that the autonomous vehicle is yielding; or a follow icon indicating that the autonomous vehicle is following another autonomous vehicle.

I: The method of any one of paragraphs F-H, wherein determining the one or more indicators comprises: determining an indicator representing a cause of maneuver based on the planned trajectory.

J: The method of paragraph I, wherein the indicator comprises at least one of: a pedestrian icon indicating a presence of a pedestrian; a car icon indicating a presence of a car; a bike icon indicating a presence of a bike; a truck icon indicating a presence of a truck; or a searching for parking icon indicating that the automatous autonomous vehicle is searching for parking spaces.

K: The method of any one of paragraphs F-J, wherein determining the one or more indicators comprises: determining an indicator representing an upcoming maneuver associated with the autonomous vehicle based on the planned trajectory, the upcoming maneuver comprising a maneuver to be executed at a future time, after completion of an intended maneuver.

L: The method of paragraph K, wherein the third indicator comprises at least one of a left turn icon indicating that the upcoming maneuver associated with the autonomous vehicle is to turn left; a right turn icon indicating that the upcoming maneuver associated with the autonomous vehicle is to turn right; a merge left icon indicating that the upcoming maneuver associated with the autonomous vehicle is to merge left; or a merge right icon indicating that the upcoming maneuver associated with the autonomous vehicle is to merge right.

M: The method of any one of paragraphs F-L, further comprising: receiving a command from the operator to control a system or subsystem of the autonomous vehicle; determining a fourth indicator indicating that the autonomous vehicle is in a manual mode and a fifth indicator requesting a disengagement report; and displaying, via the display device, the fourth indicator, and the fifth indicator.

N: The method of any one of paragraphs F-M, further comprising: recording an audio message from an operator associated with the autonomous vehicle; determining, based at least in part on the audio message, a message; and associating, as a report, the message with one or more of the sensor data, the planned trajectory, or the intended maneuver.

O: The method of paragraph N, wherein the message indicates one or more of: a discrepancy between perception data and the environment, an unsafe action proposed by the intended maneuver, or an error in one or more of the object detection, planner trajectory, or intended maneuver.

P: The method of any one of paragraphs M-O, further comprising: determining whether the autonomous vehicle is ready to be engaged; and displaying, based on whether the autonomous vehicle is ready to be engaged, at least one of a sixth indicator, indicating that an autonomy mode is ready to be engaged; or a seventh indicator, indicating that an autonomy mode is not ready to be engaged.

Q: The method of any one of paragraphs F-P, further comprising: sending a teleoperation request to a remote computing system; displaying, via the display device, a sixth indicator indicating that the autonomous vehicle is calling the remote computing system; determining that the remote computing system is monitoring the autonomous vehicle; upon determining that the remote computing system is monitoring the autonomous vehicle, displaying, via the display device, a seventh indicator indicating that the remote computing system is monitoring the autonomous vehicle; receiving a response message from the remote computing system, the response message comprising at least one of a situational interpretation, a first suggestion of disengagement, or a second suggestion of a maneuver; and displaying, via the display device, the response message.

R: The method of any one of paragraphs F-Q, further comprising displaying, together with the one or more indicators, a visualization of the environment in which the autonomous vehicle traverses, the visualization presenting at least one of a traffic signal, one or more objects, one or more map markers, or the autonomous vehicle.

S: The method of paragraph R, further comprising displaying an individual object of the one or more objects with an additional visual effect in the visualization as the autonomous vehicle traverses the environment.

T: One or more non transitory computer readable media storing instructions executable by one or more processors, wherein the instructions, when executed, cause the one or more processors to perform operations comprising: receiving sensor data associated with an autonomous vehicle traversing an environment; determining, based at least in part on the sensor data, a planned trajectory usable to control the autonomous vehicle in the environment; determining, based at least in part on the planned trajectory, situational information associated with the planned trajectory; determining one or more indicators representing the situational information associated with the autonomous vehicle; and displaying, via a display device, the one or more indicators.

While the example clauses described above are described with respect to one particular implementation, it should be understood that, in the context of this document, the content of the example clauses can also be implemented via a method, device, system, computer-readable medium, and/or another implementation. Additionally, any of examples A-T may be implemented alone or in combination with any other one or more of the examples A-T.

CONCLUSION

While one or more examples of the techniques described herein have been described, various alterations, additions, permutations and equivalents thereof are included within the scope of the techniques described herein.

In the description of examples, reference is made to the accompanying drawings that form a part hereof, which show by way of illustration specific examples of the claimed subject matter. It is to be understood that other examples can be used and that changes or alterations, such as structural changes, can be made. Such examples, changes or alterations are not necessarily departures from the scope with respect to the intended claimed subject matter. While the steps herein can be presented in a certain order, in some cases the ordering can be changed so that certain inputs are provided at different times or in a different order without changing the function of the systems and methods described. The disclosed procedures could also be executed in different orders. Additionally, various computations that are herein need not be performed in the order disclosed, and other examples using alternative orderings of the computations could be readily implemented. In addition to being reordered, the computations could also be decomposed into sub-computations with the same results.

What is claimed is:

1. A system comprising:
one or more processors; and
one or more non-transitory computer-readable media storing instructions executable by the one or more processors, wherein the instructions, when executed, cause the system to perform operations comprising:
receiving sensor data associated with an autonomous vehicle traversing an environment;
determining, based at least in part on the sensor data, an object proximate the vehicle;
determining, based at least in part on the object, a planned trajectory for the autonomous vehicle, the planned trajectory associated with an intended maneuver;

controlling the autonomous vehicle according to at least a portion of the planned trajectory;
determining a first indicator representative of the intended maneuver;
determining a second indicator representative of the object;
determining, based at least in part on the planned trajectory, an upcoming maneuver associated with the autonomous vehicle, the upcoming maneuver comprising a maneuver to be executed at a future time, after completion of the intended maneuver;
determining a third indicator representative of the upcoming maneuver;
displaying, via a display device in the autonomous vehicle, the first indicator, the second indicator, and the third indicator;
receiving a command from an operator to control the autonomous vehicle;
determining a fourth indicator indicating that the autonomous vehicle is in a manual mode and a fifth indicator requesting a disengagement report; and
displaying, via the display device in the autonomous vehicle, the fourth indicator and the fifth indicator.

2. The system of claim 1, further comprising:
recording, in the autonomous vehicle, an audio message; and
associating, as a report, one or more of at least a portion of the sensor data, the planned trajectory, the object, or the intended maneuver with the audio message.

3. The system of claim 2, further comprising:
determining, as a note, one or more of speech-to-text or natural language processing on the audio message,
wherein the report is further associated with the note.

4. The system of claim 1, the operations further comprising displaying, together with the first indicator, the second indicator, and the third indicator, a visualization of the environment in which the autonomous vehicle traverses, the visualization presenting at least one of a traffic signal, one or more objects, one or more map markers, or the autonomous vehicle.

5. A method comprising:
receiving sensor data associated with an autonomous vehicle traversing an environment;
determining, based at least in part on the sensor data, a planned trajectory usable to control the autonomous vehicle in the environment;
controlling the autonomous vehicle according to at least a portion of the planned trajectory;
determining, based at least in part on the planned trajectory, situational information associated with the planned trajectory;
determining one or more indicators representing the situational information associated with the autonomous vehicle;
displaying, via a display device in the autonomous vehicle, the one or more indicators;
receiving a command from an operator to control a system or subsystem of the autonomous vehicle;
determining an indicator indicating that the autonomous vehicle is in a manual mode and an indicator for requesting a disengagement report; and
displaying, via the display device, the indicator indicating that the autonomous vehicle is in the manual mode and the indicator for requesting the disengagement report.

6. The method of claim 5, wherein determining the one or more indicators comprises:
determining an indicator representing an intended maneuver associated with the autonomous vehicle based on the planned trajectory.

7. The method of claim 6, wherein the indicator representing the intended maneuver comprises at least one of:
a proceed icon indicating that the autonomous vehicle is proceeding;
a double parked vehicle (DPV) icon indicating that the autonomous vehicle is handling a DPV;
a lane blocked icon indicating that the autonomous vehicle is handling a blocked lane;
a missing data icon indicating that the intended maneuver of the autonomous vehicle cannot be determined;
a stopping icon indicating that the autonomous vehicle is stopping;
a caution icon indicating that the autonomous vehicle is taking caution;
a yield icon indicating that the autonomous vehicle is yielding; or
a follow icon indicating that the autonomous vehicle is following another autonomous vehicle.

8. The method of claim 5, wherein determining the one or more indicators comprises:
determining an indicator representing a cause of maneuver based on the planned trajectory.

9. The method of claim 8, wherein the indicator representing the cause of maneuver comprises at least one of:
a pedestrian icon indicating a presence of a pedestrian;
a car icon indicating a presence of a car;
a bike icon indicating a presence of a bike;
a truck icon indicating a presence of a truck; or
a searching for parking icon indicating that the automatous autonomous vehicle is searching for parking spaces.

10. The method of claim 5, wherein determining the one or more indicators comprises:
determining an indicator representing an upcoming maneuver associated with the autonomous vehicle based on the planned trajectory, the upcoming maneuver comprising a maneuver to be executed at a future time, after completion of an intended maneuver.

11. The method of claim 10, wherein the indicator representing the upcoming maneuver comprises at least one of:
a left turn icon indicating that the upcoming maneuver associated with the autonomous vehicle is to turn left;
a right turn icon indicating that the upcoming maneuver associated with the autonomous vehicle is to turn right;
a merge left icon indicating that the upcoming maneuver associated with the autonomous vehicle is to merge left; or
a merge right icon indicating that the upcoming maneuver associated with the autonomous vehicle is to merge right.

12. The method of claim 5, further comprising:
recording an audio message from an operator associated with the autonomous vehicle;
determining, based at least in part on the audio message, a message; and
associating, as a report, the message with one or more of the sensor data, the planned trajectory, or an intended maneuver.

13. The method of claim 12, wherein the message indicates one or more of:
a discrepancy between perception data and the environment,
an unsafe action proposed by the intended maneuver, or an error in one or more of an object detection, the planned trajectory, or the intended maneuver.

14. The method of claim 5, further comprising:
determining whether the autonomous vehicle is ready to be engaged; and
displaying, based on whether the autonomous vehicle is ready to be engaged, at least one of:
an indicator indicating that an autonomy mode is ready to be engaged; or
an indicator indicating that the autonomy mode is not ready to be engaged.

15. The method of claim 5, further comprising:
sending a teleoperation request to a remote computing system;
displaying, via the display device, an indicator indicating that the autonomous vehicle is calling the remote computing system;
determining that the remote computing system is monitoring the autonomous vehicle;
upon determining that the remote computing system is monitoring the autonomous vehicle, displaying, via the display device, an indicator indicating that the remote computing system is monitoring the autonomous vehicle;
receiving a response message from the remote computing system, the response message comprising at least one of a situational interpretation, a first suggestion of disengagement, or a second suggestion of a maneuver; and
displaying, via the display device, the response message.

16. The method of claim 5, further comprising displaying, together with the one or more indicators, a visualization of the environment in which the autonomous vehicle traverses, the visualization presenting at least one of a traffic signal, one or more objects, one or more map markers, or the autonomous vehicle.

17. The method of claim 16, further comprising displaying an individual object of the one or more objects with an additional visual effect in the visualization as the autonomous vehicle traverses the environment.

18. One or more non transitory computer readable media storing instructions executable by one or more processors, wherein the instructions, when executed, cause the one or more processors to perform operations comprising:
receiving sensor data associated with an autonomous vehicle traversing an environment;
determining, based at least in part on the sensor data, a planned trajectory usable to control the autonomous vehicle in the environment;
controlling the autonomous vehicle according to at least a portion of the planned trajectory;
determining, based at least in part on the planned trajectory, situational information associated with the planned trajectory;
determining one or more indicators representing the situational information associated with the autonomous vehicle;
displaying, via a display device, the one or more indicators;
sending a teleoperation request to a remote computing system;
displaying, via the display device, an indicator indicating that the autonomous vehicle is calling the remote computing system;
determining that the remote computing system is monitoring the autonomous vehicle;
upon determining that the remote computing system is monitoring the autonomous vehicle, displaying, via the display device, an indicator indicating that the remote computing system is monitoring the autonomous vehicle;
receiving a response message from the remote computing system, the response message comprising at least one of a situational interpretation, a first suggestion of disengagement, or a second suggestion of a maneuver; and
displaying, via the display device, the response message.

\* \* \* \* \*